US012701430B2

(12) United States Patent
Hosseini et al.

(10) Patent No.: US 12,701,430 B2
(45) Date of Patent: Aug. 4, 2026

(54) SPECTRUM SHARING IN THE SPATIAL DOMAIN ACROSS RADIO ACCESS TECHNOLOGIES

(71) Applicant: QUALCOMM Incorporated, San Diego, CA (US)

(72) Inventors: Seyedkianoush Hosseini, San Diego, CA (US); Wooseok Nam, San Diego, CA (US); Jing Jiang, San Diego, CA (US); Tao Luo, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 297 days.

(21) Appl. No.: 18/163,800

(22) Filed: Feb. 2, 2023

(65) Prior Publication Data

US 2024/0267749 A1 Aug. 8, 2024

(51) Int. Cl.
*H04W 16/28* (2009.01)
*H04L 1/00* (2006.01)
*H04L 5/00* (2006.01)

(52) U.S. Cl.
CPC ........... *H04W 16/28* (2013.01); *H04L 1/0067* (2013.01); *H04L 5/0051* (2013.01)

(58) Field of Classification Search
CPC ... H04W 16/28; H04W 16/224; H04W 16/32; H04W 16/225; H04L 1/0067; H04L 1/005; H04L 1/0051; H04L 1/0048; H04L 1/0053; H04L 1/0091; H04L 1/0013; H04L 1/08; H04L 1/0057; H04L 1/0056
See application file for complete search history.

(56) References Cited

U.S. PATENT DOCUMENTS

| | | | | |
|---|---|---|---|---|
| 2017/0332357 A1* | 11/2017 | Xu | .................... | H04W 72/0453 |
| 2019/0342888 A1* | 11/2019 | Hosseini | .......... | H04W 72/1215 |
| 2020/0015136 A1* | 1/2020 | Damnjanovic | ....... | H04W 36/10 |
| 2020/0177416 A1* | 6/2020 | Jiang | .................... | H04L 5/0091 |
| 2021/0050934 A1* | 2/2021 | Khoshnevisan | ...... | H04L 1/0067 |
| 2021/0051510 A1* | 2/2021 | Chae | .................... | H04B 17/318 |
| 2021/0243609 A1* | 8/2021 | Lei | ........................ | H04L 5/0048 |
| 2021/0266753 A1* | 8/2021 | Kumar | .............. | H04W 28/0252 |
| 2021/0376894 A1* | 12/2021 | Cha | ....................... | H04B 7/0695 |

(Continued)

FOREIGN PATENT DOCUMENTS

| | | | | | |
|---|---|---|---|---|---|
| CN | | 111972027 A | * | 11/2020 | ............ H04L 5/001 |
| WO | WO 2021138128 | | * | 7/2021 | |

(Continued)

*Primary Examiner* — Phong La
(74) *Attorney, Agent, or Firm* — ArentFox Schiff, LLP

(57) ABSTRACT

A network node of a first radio access technology (RAT) may configure, from a set of resources available for dynamic spectrum sharing between the first RAT and a second RAT, a first subset of resources on which to communicate with one of rate matching or spatial domain multiplexing associated with the second RAT. A UE may receive, from a network node associated with the first RAT, information indicating a first subset of resources from a set of resources available for dynamic spectrum sharing between the first RAT and a second RAT with one of rate matching or spatial domain multiplexing. The network node and the UE may communicate on the first subset of resources from the set of resources with the one of rate matching or spatial domain multiplexing.

30 Claims, 11 Drawing Sheets

(56)     References Cited

U.S. PATENT DOCUMENTS

| 2022/0104182 | A1* | 3/2022 | Kim | ...................... | H04L 5/0051 |
| 2022/0338208 | A1* | 10/2022 | Chen | ................. | H04W 28/0967 |
| 2024/0039658 | A1* | 2/2024 | Raao | ...................... | H04L 5/005 |
| 2024/0267749 | A1* | 8/2024 | Hosseini | ............... | H04L 5/0051 |
| 2024/0314818 | A1* | 9/2024 | Yu | ........................ | H04W 72/40 |

FOREIGN PATENT DOCUMENTS

| WO | WO-2021138128 A1 * | 7/2021 | ........... H04B 7/0626 |
| WO | WO-2023197154 A1 * | 10/2023 | |

* cited by examiner

Configuration, from a set of resources available for dynamic spectrum sharing between a first RAT and a second RAT, of a first subset of resources on which to communicate with one of rate matching or spatial domain multiplexing associated with the second RAT

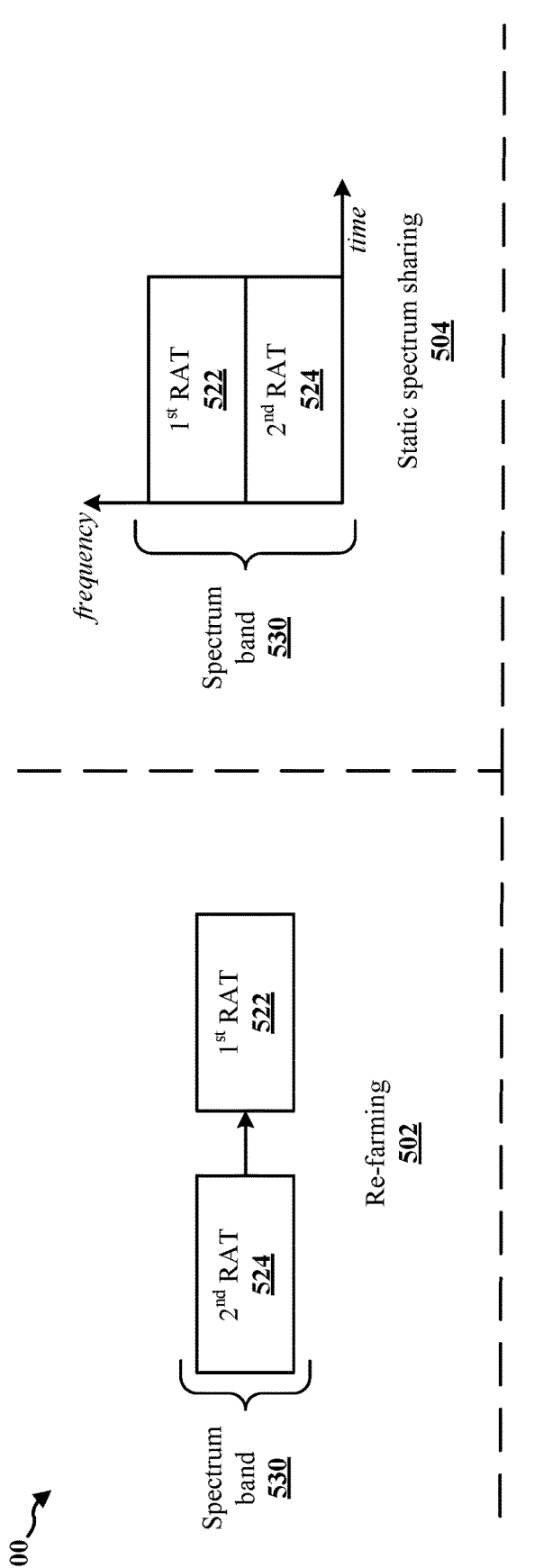
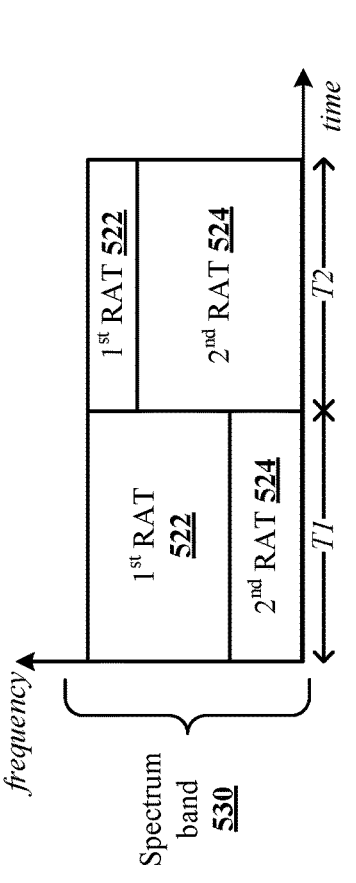
FIG. 5

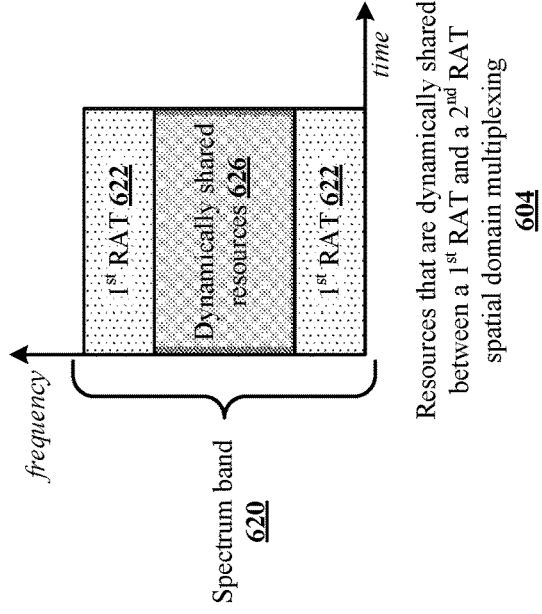
Resources that are dynamically shared between a 1st RAT and a 2nd RAT spatial domain multiplexing
604
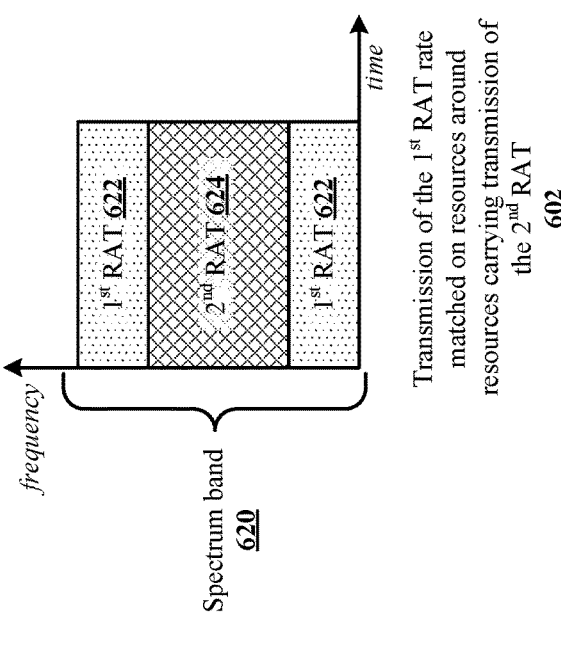
Transmission of the 1st RAT rate matched on resources around resources carrying transmission of the 2nd RAT
602
FIG. 6
600

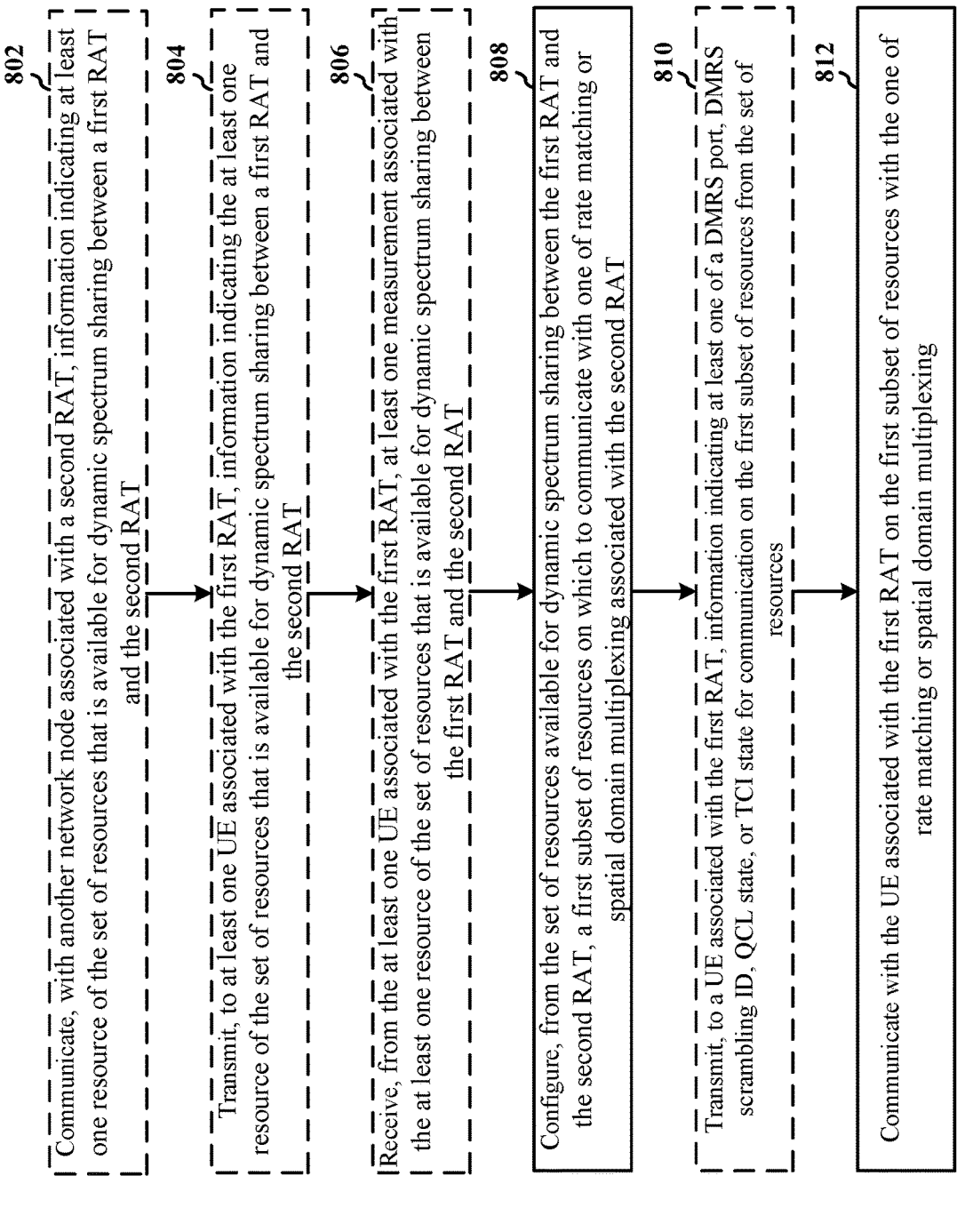

800

802 — Communicate, with another network node associated with a second RAT, information indicating at least one resource of the set of resources that is available for dynamic spectrum sharing between a first RAT and the second RAT 804 — Transmit, to at least one UE associated with the first RAT, information indicating the at least one resource of the set of resources that is available for dynamic spectrum sharing between a first RAT and the second RAT 806 — Receive, from the at least one UE associated with the first RAT, at least one measurement associated with the at least one resource of the set of resources that is available for dynamic spectrum sharing between the first RAT and the second RAT 808 — Configure, from the set of resources available for dynamic spectrum sharing between the first RAT and the second RAT, a first subset of resources on which to communicate with one of rate matching or spatial domain multiplexing associated with the second RAT 810 — Transmit, to a UE associated with the first RAT, information indicating at least one of a DMRS port, DMRS scrambling ID, QCL state, or TCI state for communication on the first subset of resources from the set of resources 812 — Communicate with the UE associated with the first RAT on the first subset of resources with the one of rate matching or spatial domain multiplexing

FIG. 8

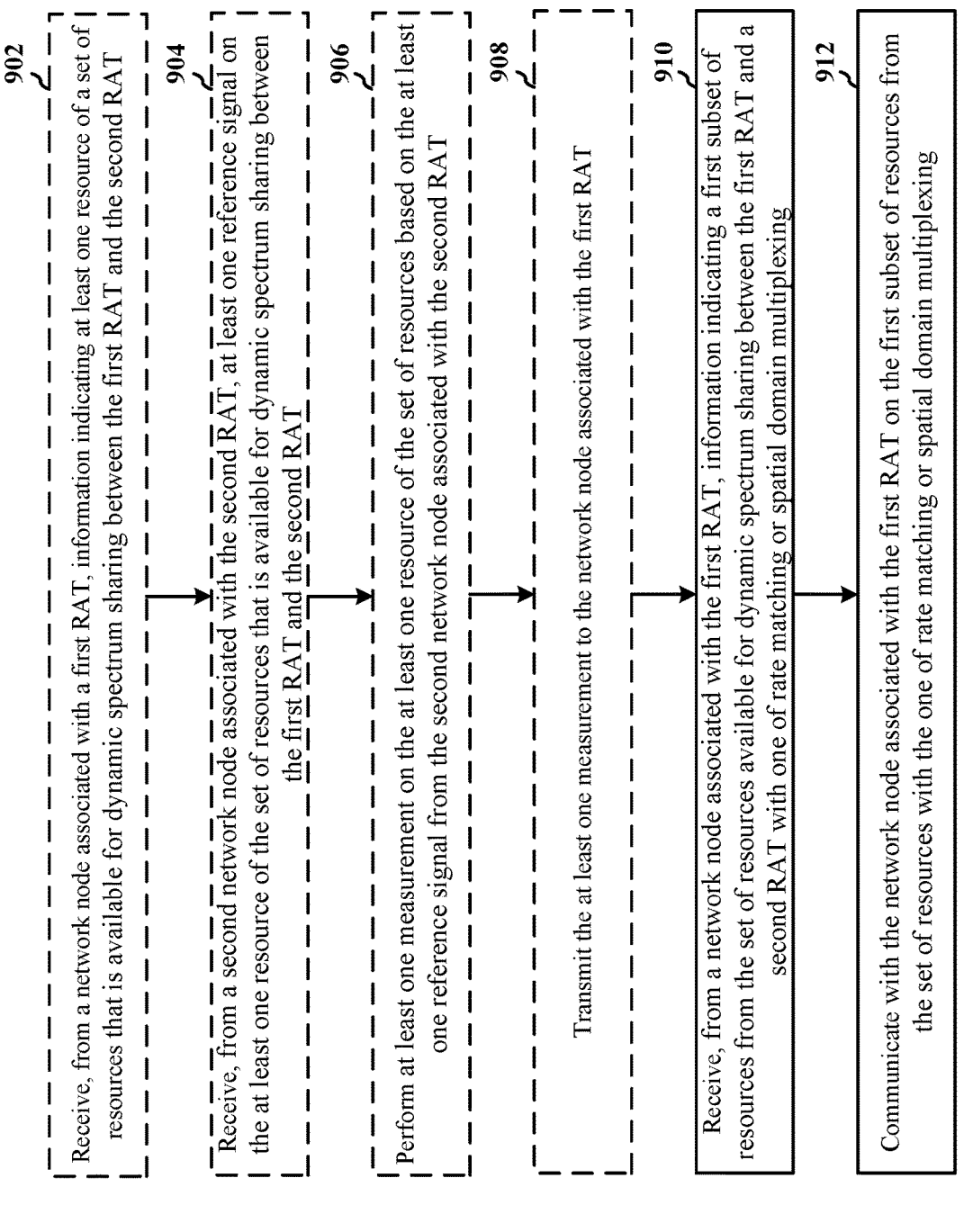

900

902

Receive, from a network node associated with a first RAT, information indicating at least one resource of a set of resources that is available for dynamic spectrum sharing between the first RAT and the second RAT

904

Receive, from a second network node associated with the second RAT, at least one reference signal on the at least one resource of the set of resources that is available for dynamic spectrum sharing between the first RAT and the second RAT

906

Perform at least one measurement on the at least one resource of the set of resources based on the at least one reference signal from the second network node associated with the second RAT

908

Transmit the at least one measurement to the network node associated with the first RAT

910

Receive, from a network node associated with the first RAT, information indicating a first subset of resources from the set of resources available for dynamic spectrum sharing between the first RAT and a second RAT with one of rate matching or spatial domain multiplexing

912

Communicate with the network node associated with the first RAT on the first subset of resources from the set of resources with the one of rate matching or spatial domain multiplexing

FIG. 9

SPECTRUM SHARING IN THE SPATIAL DOMAIN ACROSS RADIO ACCESS TECHNOLOGIES

BACKGROUND

Technical Field

The present disclosure generally relates to communication systems, and more particularly, to spatial domain multiplexing of transmissions on resources that are dynamically shareable between multiple radio access technologies.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Fifth Generation (5G) New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a network node associated with a first radio access technology (RAT) or a component thereof. The apparatus may be configured to configure, from a set of resources available for dynamic spectrum sharing between the first RAT and a second RAT, a first subset of resources on which to communicate with one of rate matching or spatial domain multiplexing associated with the second RAT. The apparatus may be further configured to communicate with a user equipment (UE) associated with the first RAT on the first subset of resources from the set of resources with the one of rate matching or spatial domain multiplexing.

In another aspect of the disclosure, another method, another computer-readable medium, and another apparatus are provided. The other apparatus may be a UE associated with a first RAT or a component thereof. The other apparatus may be configured to receive, from a network node associated with the first RAT, information indicating a first subset of resources from a set of resources available for dynamic spectrum sharing between the first RAT and a second RAT with one of rate matching or spatial domain multiplexing. The other apparatus may be further configured to communicate with the network node associated with the first RAT on the first subset of resources from the set of resources with the one of rate matching or spatial domain multiplexing.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 5 is a diagram illustrating example schemes for assigning a band of a spectrum to at least one of a first radio access technology (RAT) or a second RAT.

FIG. 6 is a diagram illustrating example resource configurations for dynamic spectrum sharing between a first RAT and a second RAT.

FIG. 8 is a flowchart illustrating an example of a method of wireless communication at a network node.

FIG. 9 is a flowchart illustrating an example of a method of wireless communication at a UE.

DETAILED DESCRIPTION

Figure 1:
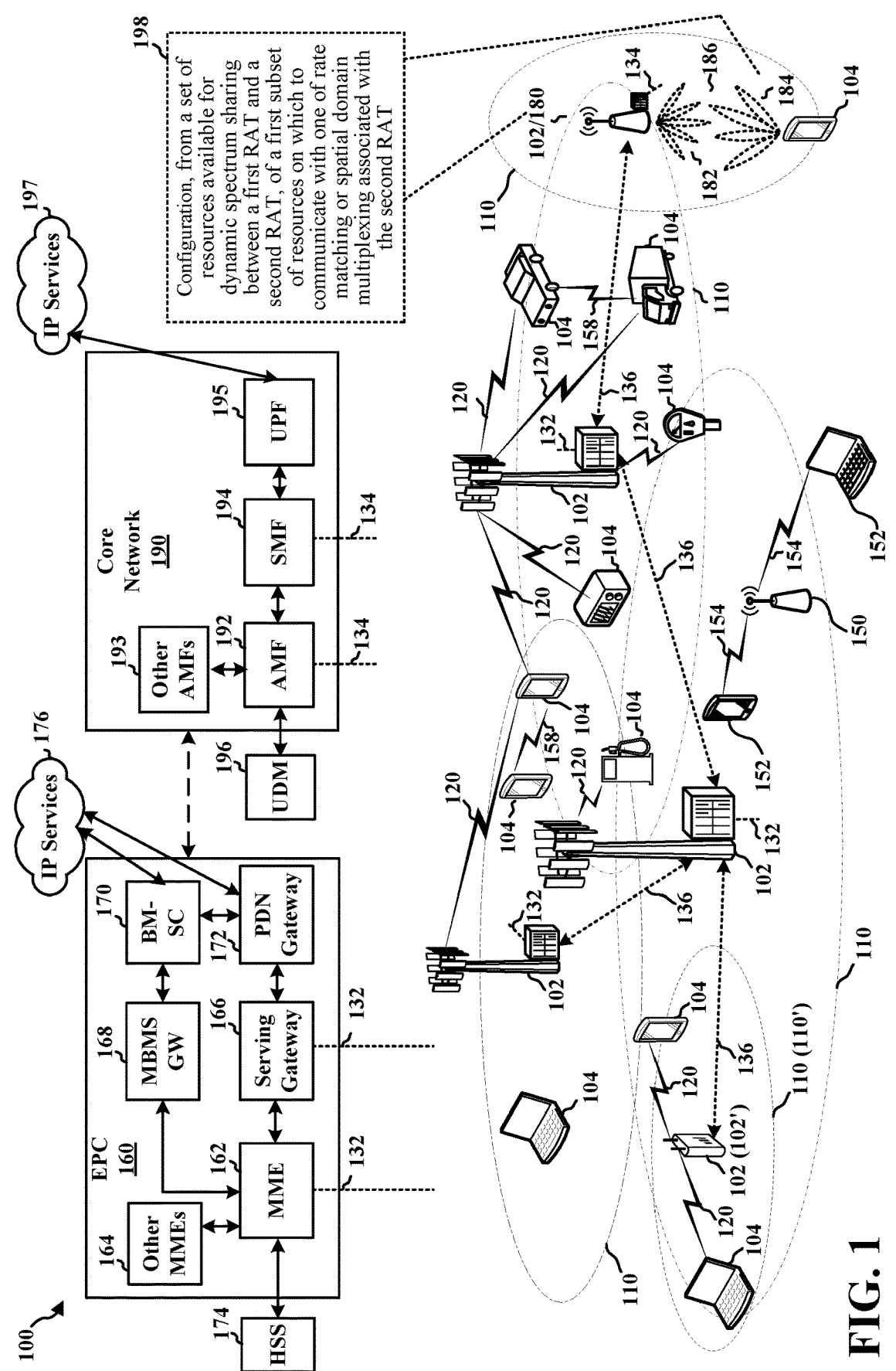
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, the concepts and related aspects described in the present disclosure may be implemented in the absence of some or all of such specific details. In some instances, well-known structures, components, and the like are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, computer-executable code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or computer-executable code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer-executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells, such as high power cellular base stations, and/or small cells, such as low power cellular base stations (including femtocells, picocells, and microcells).

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR), which may be collectively referred to as the Next Generation Radio Access Network (RAN) (NG-RAN), may interface with a core network 190 through second backhaul links 134. In addition to other functions, the base stations 102 may perform one or more of: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, Multimedia Broadcast Multicast Service (MBMS), subscriber and equipment trace, RAN information management (RIM), paging, positioning, and delivery of warning messages.

In some aspects, the base stations 102 may communicate directly or indirectly (e.g., through the EPC 160 or core network 190) with each other over third backhaul links 136 (e.g., X2 interface). The first backhaul links 132, the second backhaul links 134, and the third backhaul links 136 may be wired, wireless, or some combination thereof. At least some of the base stations 102 may be configured for integrated access and backhaul (IAB). Accordingly, such base stations may wirelessly communicate with other base stations, which also may be configured for IAB.

At least some of the base stations 102 configured for IAB may have a split architecture including multiple units, some or all of which may be collocated or distributed, and which may communicate with one another. For example, FIG. 2, infra, illustrates an example disaggregated base station 200 architecture that includes at least one of a central unit (CU) 210, a distributed unit (DU) 230, a radio unit (RU) 240, a remote radio head (RRH), a remote unit, and/or another similar unit configured to implement one or more layers of a radio protocol stack.

The base stations 102 may wirelessly communicate with the UEs 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.).

A UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Each of the base stations 102 may provide communication coverage for a respective geographic coverage area 110, which may also be referred to as a "cell." Potentially, two or more geographic coverage areas 110 may at least partially overlap with one another, or one of the geographic coverage areas 110 may contain another of the geographic coverage areas. For example, the small cell 102' may have a coverage area 110' that overlaps with the coverage area 110 of one or more macro base stations 102. A network that includes both small cells and macrocells may be known as a heterogeneous network. A heterogeneous network may also include Home Evolved Node Bs (eNBs) (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use multiple-input and multiple-output (MIMO) antenna technology, including spatial multiplexing, beamforming, and/or transmit diversity. Wireless links or radio links may be on one or more carriers, or component carriers (CCs). The base stations 102 and/or UEs 104 may use spectrum up to Y megahertz (MHz) (e.g., Y may be equal to or approximately equal to 5, 10, 15, 20, 100, 400, etc.) bandwidth per carrier allocated in a carrier aggregation of up to a total of Yx MHz (e.g., x CCs) used for transmission in each direction. The CCs may or may not be adjacent to each other. Allocation of CCs may be asymmetric with respect to downlink and uplink (e.g., more or fewer CCs may be allocated for downlink than for uplink).

The CCs may include a primary CC and one or more secondary CCs. A primary CC may be referred to as a primary cell (PCell) and each secondary CC may be referred to as a secondary cell (SCell). The PCell may also be referred to as a "serving cell" when the UE is known both to a base station at the access network level and to at least one core network entity (e.g., AMF and/or MME) at the core network level, and the UE may be configured to receive downlink control information in the access network, such as where the UE is in a radio resource control (RRC) Connected state. In some instances in which carrier aggregation is configured for the UE, each of the PCell and the one or more SCells may be a serving cell.

Certain UEs 104 may communicate with each other using device-to-device (D2D) communication link 158. The D2D communication link 158 may use the downlink/uplink WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (or "mmWave" or simply "mmW") band in documents and articles, despite being different from the extremely high frequency (EHF) band (30 GHz-300 GHz) which is identified by the International Telecommunications Union (ITU) as a "millimeter wave" band. In some aspects, "mmW" or "near-mmW" may additionally or alternatively refer to a 60 GHz frequency range, which may include multiple channels outside of 60 GHz. For example, a 60 GHz frequency band may refer to a set of channels spanning from 57.24 GHz to 70.2 GHz.

In view of the foregoing, unless specifically stated otherwise, the term "sub-6 GHz," "sub-7 GHz," and the like, to the extent used herein, may broadly represent frequencies that may be less than 6 GHz, frequencies that may be less than 7 GHz, frequencies that may be within FR1, and/or frequencies that may include mid-band frequencies. Further, unless specifically stated otherwise, the term "millimeter wave" and other similar references, to the extent used herein, may broadly represent frequencies that may include mid-band frequencies, frequencies that may be within FR2, and/or frequencies that may be within the EHF band.

A base station 102 may be implemented as a macro base station providing a large cell or may be implemented as a small cell 102' having a small cell coverage area. Some base stations 102 may operate in a traditional sub-6 GHz (or sub-7 GHz) spectrum, in mmW frequencies, and/or near-mmW frequencies in communication with the UE 104. When such a base station operates in mmW or near-mmW frequencies, the base station may be referred to as a mmW base station 180. The mmW base station 180 may utilize beamforming 186 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182. The UE 104 may receive the beamformed signal from the base station 180 in one or more receive directions 184. The UE 104 may also transmit a beamformed signal to the base station 180 in one or more transmit directions. The base station 180 may receive the beamformed signal from the UE 104 in one or more receive directions. One or both of the base station 180 and/or the UE 104 may perform beam training to determine the best receive and/or transmit directions for the one or both of the base station 180 and/or UE 104. The transmit and receive directions for the base station 180 may or may not be the same. The transmit and receive directions for the UE 104 may or may not be the same.

In various different aspects, one or more of the base stations 102/180 may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology.

In some aspects, one or more of the base stations 102/180 may be connected to the EPC 160 and may provide respective access points to the EPC 160 for one or more of the UEs 104. The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, with the Serving Gateway 166 being connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a Packet Switch (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

In some other aspects, one or more of the base stations 102/180 may be connected to the core network 190 and may provide respective access points to the core network 190 for one or more of the UEs 104. The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a PS Streaming Service, and/or other IP services.

In certain aspects, the base station 102/180 may be associated with a first radio access technology (RAT) and may configure a configuration, from a set of resources available for dynamic spectrum sharing between the first RAT and a second RAT, of a first subset of resources on which to communicate with one of rate matching or spatial domain multiplexing associated with the second RAT (198). The base station 102/180 may be further configured to communicate with a UE 104 associated with the first RAT on the first subset of resources with the one of rate matching or spatial domain multiplexing.

Correspondingly, the UE 104 may be associated with the first RAT and may be configured to receive, from the base station 102/180 associated with the first RAT, the configuration of the first subset of resources from a set of resources available for dynamic spectrum sharing between the first RAT and the second RAT with one of rate matching or spatial domain multiplexing (198). The UE 104 may be further configured to communicate with the base station 102/180 associated with the first RAT on the first subset of resources from the set of resources with the one of rate matching or spatial domain multiplexing.

Although the present disclosure may focus on the Sixth Generation (6G) and 5G NR telecommunication standards promulgated by the Third Generation Partnership Project (3GPP), the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

Figure 2:
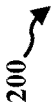
FIG. 2 is a diagram illustrating an example disaggregated base station architecture.

FIG. 2 shows a diagram illustrating an example disaggregated base station 200 architecture. Deployment of communication systems, such as 5G NR systems, may be arranged in multiple manners with various components or constituent parts. In a 5G NR system, or network, a network node, a network entity, a mobility element of a network, a RAN) node, a core network node, a network element, or a network equipment, such as a base station, or one or more units (or one or more components) performing base station functionality, may be implemented in an aggregated or disaggregated architecture. For example, a base station (or network node) may be implemented as an aggregated base station (also known as a standalone base station or a monolithic base station) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU).

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station 200 architecture may include one or more CUs 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more DUs 230 via respective midhaul links, such as an F1 interface. The DUs 230 may communicate with one or more RUs 240 via respective fronthaul links. The RUs 240 may communicate with respective UEs 104 via one or more radio frequency (RF) access links. In some implementations, the UE 104 may be simultaneously served by multiple RUs 240.

Each of the units, i.e., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 210 may host one or more higher layer control functions. Such control functions can include RRC, packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (i.e., Central Unit-User Plane (CU-UP)), control plane functionality (i.e., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by 3GPP. In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communication with one or more UEs 104. In some implementations, real-time and non-real-time aspects of control and user plane communication with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205. The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225.

The Non-RT RIC 215 may be coupled to or communicate with (such as via an AI interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as AI policies).

Figures 3A, 3B, 3C, 3D:
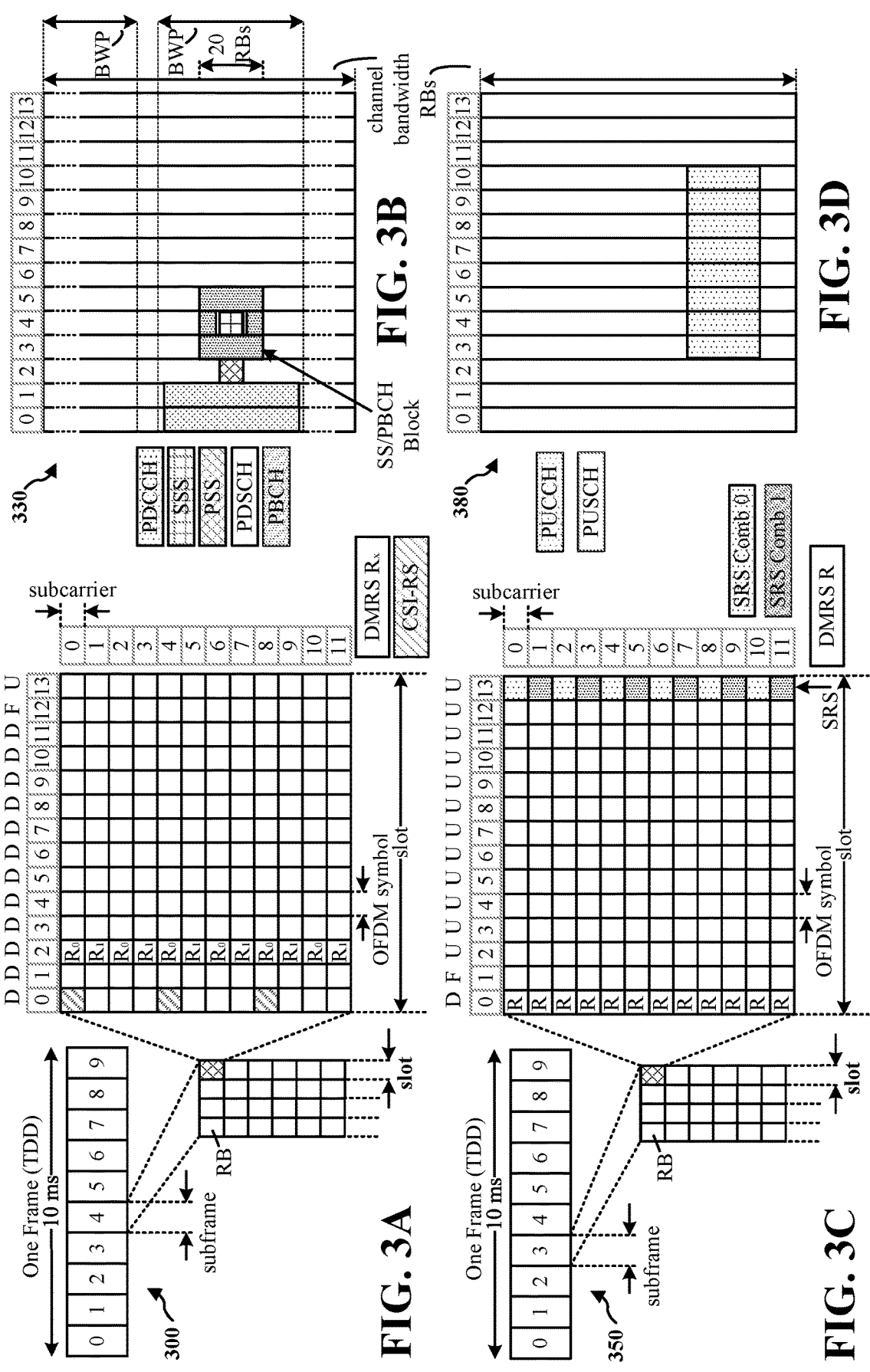
FIG. 3A is a diagram illustrating an example of a first frame.
FIG. 3B is a diagram illustrating an example of downlink channels within a subframe.
FIG. 3C is a diagram illustrating an example of a second frame.
FIG. 3D is a diagram illustrating an example of uplink channels within a subframe.

FIG. 3A is a diagram illustrating an example of a first subframe 300 within a 5G NR frame structure. FIG. 3B is a diagram illustrating an example of downlink channels within a 5G NR subframe 330. FIG. 3C is a diagram illustrating an example of a second subframe 350 within a 5G NR frame structure. FIG. 3D is a diagram illustrating an example of uplink channels within a 5G NR subframe 380. The 5G NR frame structure may be frequency division duplexed (FDD) in which for a particular set of subcarriers (carrier system bandwidth), subframes within the set of subcarriers are dedicated for either downlink or uplink, or may be time division duplexed (TDD) in which for a particular set of subcarriers (carrier system bandwidth), subframes within the set of subcarriers are dedicated for both downlink and uplink. In the examples provided by FIGS. 3A and 3C, the 5G NR frame structure is assumed to be TDD, with subframe 4 being configured with slot format 28 (with mostly downlink), where D is downlink, U is uplink, and F is flexible for use between downlink/uplink, and subframe 3 being configured with slot format 34 (with mostly uplink). While subframes 3, 4 are shown with slot formats 34, 28, respectively, any particular subframe may be configured with any of the various available slot formats 0-61. Slot formats 0, 1 are all downlink, uplink, respectively. Other slot formats 2-61 include a mix of downlink, uplink, and flexible symbols. UEs are configured with the slot format (dynamically through downlink control information (DCI), or semistatically/statically through RRC signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on downlink may be cyclic prefix (CP) orthogonal frequency-division multiplexing (OFDM) (CP-OFDM) symbols. The symbols on uplink may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu 0$ to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kilohertz (kHz), where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 microseconds ($\mu s$). Within a set of frames, there may be one or more different bandwidth parts (BWPs) (see FIG. 3B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry at least one pilot signal, such as a reference signal (RS), for the UE. Broadly, RSs may be used for beam training and management, tracking and positioning, channel estimation, and/or other such purposes. In some configurations, an RS may include at least one demodulation RS (DM-RS) (indicated as $R_x$ for one particular configuration, where 100x is the port number, but other DM-RS configurations are possible) and/or at least one channel state information (CSI) RS (CSI-RS) for channel estimation at the UE. In some other configurations, an RS may additionally or alternatively include at least one beam measurement (or management) RS (BRS), at least one beam refinement RS (BRRS), and/or at least one phase tracking RS (PT-RS).

FIG. 3B illustrates an example of various downlink channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. A UE (such as a UE 104 of FIG. 1) may use the PSS to determine subframe/symbol timing and a physical layer identity. A secondary synchronization signal (SSS) may be within symbol 4 of particular subframes of a frame. A UE (such as a UE 104 of FIG. 1) may use the SSS to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIGs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the uplink.

FIG. 3D illustrates an example of various uplink channels within a subframe of a frame. The PUCCH may be located as indicated in one configuration. The PUCCH carries uplink control information (UCI), which may include a scheduling request (SR), a channel quality indicator (CQI), a precoding matrix indicator (PMI), a rank indicator (RI), and hybrid automatic repeat request (HARD) acknowledgement (ACK)/non-acknowledgement (NACK) feedback. The PUSCH carries data, and may additionally be used to carry a buffer status report (BSR), a power headroom report (PHR), and/or UCI.

Figure 4:
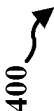
FIG. 4 is a diagram illustrating an example of a base station and user equipment (UE) in an access network.

FIG. 4 is a block diagram of a base station 410 in communication with a UE 450 in an access network 400. In the downlink, IP packets from the EPC 160 may be provided to a controller/processor 475. The controller/processor 475 implements Layer 2 (L2) and Layer 3 (L3) functionality. L3 includes an RRC layer, and L2 includes a SDAP layer, a PDCP layer, an RLC layer, and a MAC layer. The controller/processor 475 provides RRC layer functionality associated with broadcasting of system information (e.g., MIB, SIBs), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 416 and the receive (RX) processor 470 implement Layer 1 (L1) functionality associated with various signal processing functions. L1, which includes a PHY layer, may include error detection on the transport channels, FEC coding/decoding of the transport channels, interleaving, rate matching, mapping onto physical channels, modulation/demodulation of physical channels, and MIMO antenna processing. The TX processor 416 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 474 may be used to determine the coding and modulation scheme, as well as for spatial processing. The channel estimate may be derived from a reference signal and/or channel condition feedback transmitted by the UE 450. Each spatial stream may then be provided to a different antenna 420 via a separate transmitter 418TX. Each transmitter 418TX may modulate an RF carrier with a respective spatial stream for transmission.

At the UE 450, each receiver 454RX receives a signal through at least one respective antenna 452. Each receiver 454RX recovers information modulated onto an RF carrier and provides the information to the receive (RX) processor 456. The TX processor 468 and the RX processor 456 implement L1 functionality associated with various signal processing functions. The RX processor 456 may perform spatial processing on the information to recover any spatial streams destined for the UE 450. If multiple spatial streams are destined for the UE 450, they may be combined by the RX processor 456 into a single OFDM symbol stream. The RX processor 456 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 410. These soft decisions may be based on channel estimates computed by the channel estimator 458. The soft decisions are then decoded and deinterleaved to recover the data and control signals that were originally transmitted by the base station 410 on the physical channel. The data and control signals are then provided to the controller/processor 459, which implements L3 and L2 functionality.

The controller/processor 459 can be associated with a memory 460 that stores program codes and data. The memory 460 may be referred to as a computer-readable medium. In the uplink, the controller/processor 459 provides demultiplexing between transport and logical channels, packet reassembly, deciphering, header decompression, and control signal processing to recover IP packets from the EPC 160. The controller/processor 459 is also responsible for error detection using an ACK and/or NACK protocol to support HARQ operations.

Similar to the functionality described in connection with the downlink transmission by the base station 410, the controller/processor 459 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 458 from a reference signal or feedback transmitted by the base station 410 may be used by the TX processor 468 to select the appropriate coding and modulation schemes, and to facilitate spatial processing. The spatial streams generated by the TX processor 468 may be provided to different antenna 452 via separate transmitters 454TX. Each transmitter 454TX may modulate an RF carrier with a respective spatial stream for transmission.

The uplink transmission is processed at the base station 410 in a manner similar to that described in connection with the receiver function at the UE 450. Each receiver 418RX receives a signal through at least one respective antenna 420. Each receiver 418RX recovers information modulated onto an RF carrier and provides the information to a RX processor 470.

The controller/processor 475 can be associated with a memory 476 that stores program codes and data. The memory 476 may be referred to as a computer-readable medium. In the uplink, the controller/processor 475 provides demultiplexing between transport and logical channels, packet reassembly, deciphering, header decompression, control signal processing to recover IP packets from the UE 450.

IP packets from the controller/processor 475 may be provided to the EPC 160. The controller/processor 475 is also responsible for error detection using an ACK and/or NACK protocol to support HARQ operations.

In some aspects, at least one of the TX processor 468, the RX processor 456, and the controller/processor 459 may be configured to perform aspects in connection with the configuration 198 of FIG. 1.

In some other aspects, at least one of the TX processor 416, the RX processor 470, and the controller/processor 475 may be configured to perform aspects in connection with the configuration 198 of FIG. 1.

FIG. 5 is a diagram 500 illustrating example schemes 502, 504, 506 for assigning a band of a spectrum to at least one of a first RAT or a second RAT. The proliferation of wireless communications devices and the substantial broadening of their applications has resulted in a commensurate increase in the demand for bandwidth to accommodate such growth. However, the frequency spectrum is a finite resource, and consequently, bands cannot be allocated in perpetuity. As the scarcity of the spectrum increases, improvements and enhancements to spectrum assignment may reconcile the competing interests of legacy technologies and devices with current and next generation technologies and devices.

For example, 3GPP promulgates telecommunication standards for RATs. The telecommunication standards evolve over time (e.g., as needs change and technology improves), and when significant and/or new and different infrastructure is fundamental to implementing new(er) releases of such telecommunication standards, a next generation RAT may be defined. Illustratively, 5G NR is the next generation RAT with respect to the legacy RAT of 4G LTE. However, 6G is the next generation RAT with respect to the legacy RAT of 5G NR.

While a next generation RAT may be backwards compatible with a legacy RAT, performance of infrastructure and devices in the next generation RAT may be suboptimal due to the constraints of the legacy RAT, and additionally, the legacy RAT may be incompatible with the next generation RAT. Therefore, contemporaneously serving both the legacy RAT and the next generation RAT in the same spectrum band(s) may be impractical and/or inefficient. Instead, the spectrum may be shared between the legacy RAT and the next generation RAT.

As illustrated in FIG. 5, a first RAT and a second RAT may share at least one spectrum band 530. In some examples, the first RAT may be a 6G RAT and the second RAT may be a 5G NR RAT. In some other examples, the first RAT may be a 5G NR RAT and the second RAT may be a 6G RAT. Different schemes 502, 504, 506 may be implemented to allocate a spectrum band 530 to resources 522 of the first RAT and resources 524 of the second RAT.

With reference to the re-farming scheme 502, the spectrum band 530 may be initially dedicated to resources 524 of the second RAT, e.g., such as where the first RAT has not yet been deployed and/or activated. When the first RAT is deployed and/or activated, the spectrum band 530 may be reassigned to the first RAT, and therefore, the spectrum band 530 may be rededicated to the resources 522 of the first RAT. As the spectrum band 530 is finite, the second RAT resources 524 may be unallocable upon rededication of the spectrum band 530 to the first RAT resources 522. Thus, the second RAT may be effectively "turned off" so that second RAT resources 524 are unavailable.

The re-farming scheme 502 may be undesirable for a number of reasons. First, rededicating the spectrum band 530 from second RAT resources 524 to first RAT resources

522 may be inefficient, irresponsible, and potentially even dangerous because second RAT devices may become unusable when the second RAT is turned off. The lack of such usability may cause equipment operating in the second RAT to malfunction, disable critical lines of communication implemented in the second RAT, and so forth. Second, an abrupt switch between RATs may incur a substantial overhead expense in numerous areas, as the costs commensurate with switching from the second RAT to the first RAT cannot be defrayed over time.

An alternative to the re-farming scheme 502 may be a static spectrum sharing scheme 504. In some aspects of the static spectrum sharing scheme 504, the spectrum band 530 may be divided into at least two sub-bands, with the at least one sub-band being dedicated to resources 522 of the first RAT and at least one other sub-band being dedicated to resources 524 of the second RAT. In some other aspects of static spectrum sharing, time resources may be divided between at least two periods, with one period being dedicated to resources of the first RAT and at least one other period being dedicated to resources of the second RAT. Thus, with static spectrum sharing, orthogonality of resources may be achieved in both the time domain and the frequency domain.

However, the assignment of orthogonal resources may be immutable under the static spectrum sharing scheme 504. Consequently, the static spectrum sharing scheme 504 may be suboptimal (e.g., inefficient), for example, when traffic is bursty, as neither the first RAT nor the second RAT is able to utilize all resources of the spectrum. Thus, in instances when the traffic load is high on one RAT but low on the other RAT, performance in the one RAT having the high traffic load may suffer while resources of the other RAT having the low traffic load may be unused.

A third spectrum sharing scheme may be the dynamic spectrum sharing scheme 506. According to such a scheme 506, the spectrum band 530 may be divided into different sub-bands at different times, for example, depending on the traffic and usage conditions of the first and/or second RATs.

Illustratively, at a first time T1, the spectrum band 530 may be divided such that a greater portion is dedicated to resources 522 of the first RAT than resources 524 of the second RAT. For example, at the first time T1, the amount of traffic associated with the first RAT may exceed the amount of traffic associated with the second RAT and/or the number of devices connected to a network associated with the first RAT may be greater than the number of devices connected to a network associated with the second RAT. However, at a second time T2, conditions may shift—e.g., the amount of traffic associated with the second RAT may exceed the amount of traffic associated with the first RAT and/or the number of devices connected to a network associated with the second RAT may be greater than the number of devices connected to a network associated with the first RAT. Thus, at the second time T2, the spectrum band 530 may be dynamically divided such that a greater portion is dedicated to resources 524 of the second RAT than resources 522 of the first RAT.

The dynamic spectrum sharing scheme 506 may feature a degree of efficiency that is greater than the abovementioned re-farming scheme 502 and static spectrum sharing scheme 504, as usage of the spectrum band 530 is predicated upon the service conditions of the RATs sharing the spectrum band 530. Accordingly, the dynamic spectrum sharing scheme 506 may allow for deployment of the first RAT in a spectrum band(s) dedicated to the second RAT, and further, may facilitate migrating from the second RAT to the first RAT and sharing of infrastructure between the first RAT and the second RAT.

In some aspects, network nodes of the first RAT (e.g., gNBs or 6G base stations) and network nodes of the second RAT (e.g., eNBs or gNBs) may tightly coordinate scheduling in a dynamically shared spectrum. For example, in the uplink, schedulers at network nodes of the first and/or second RATs may be configured to prevent collisions between uplink channels of the first and second RATs, timing advances may be set for timing synchronization between the first and second RATs in the dynamically shared spectrum, and subcarrier spacing may be aligned across the first and second RATs (e.g., apply 7.5 kHz frequency shift on the uplink associated with one RAT for alignment with uplink associated with the other RAT, assume the same time/frequency resource grid for both the first and second RATs). In the downlink, synchronization between RATs may be obtained in the time and/or frequency domains by networks nodes of the two RATs using a common frequency reference, such as the Global Positioning System (GPS). Further, the first RAT may work around some mandatory and/or static signaling of the second RAT, such as a PSS, SSS, PBCH, cell-specific reference signal (CRS), direct current (DC) subcarrier, etc. To do so, communication associated with the first RAT may be rate matched around some resources of the second RAT, and symbol-level, RB-level, and/or RE-level rate matching patterns may be configured and dynamically transmitted to devices of the first RAT. In addition, MBSFN subframes may be implemented (e.g., for SSB transmission with 15 kHz).

FIG. 6 is a diagram 600 illustrating example resource configurations 602, 604 for dynamic spectrum sharing between a first RAT and a second RAT. In some aspects, the first RAT may be a next generation RAT, such as a 6G RAT or a 5G NR RAT, whereas the second RAT may be a legacy RAT, such as a 5G NR RAT or a 4G LTE RAT. In some other aspects, the first RAT may be a legacy RAT, such as a 5G NR RAT or a 4G LTE RAT, whereas the second RAT may be a next generation RAT, such as a 6G RAT or a 5G NR RAT. At least one spectrum band 620 may be dynamically shared between the first and second RATs. The at least one spectrum band 620 may be contiguous or may be non-contiguous.

The dynamic spectrum sharing scheme 506 is illustrated in FIG. 5 as enabled through time-division multiplexing (TDM) and/or frequency-division multiplexing (FDM) of transmissions from the two RATs. However, where transmissions are more directional, such as where a spectrum band is in the mmWave range (e.g., for 5G and 6G transmissions), rate matching using TDM and/or FDM may be conservative and may result in some inefficient resource allocation. In particular, the directional nature of transmissions in relative higher bands (e.g., FR2) may prevent interference from one RAT to another RAT on some resources that are dynamically shareable between the one RAT and by the other RAT, such as when signaling from the one RAT and signaling from the other RAT are scheduled on overlapping resources of the RATs.

In view of the foregoing, spatial domain multiplexing may be utilized for dynamically sharing the spectrum band 620, which may improve resource usage efficiency relative to only TDM and/or FDM. According to various aspects of the present disclosure, multi-RAT spectrum sharing may be performed in the spatial domain based on one or more parameters used for communication on resources included in the spectrum band 620, such as one or more of a DMRS port indication, a DMRS scrambling identifier (ID), a quasi-collocation (QCL) assumption, and/or a transmission configuration indicator (TCI) state. In particular, rate matching of transmissions of one RAT around resources allocated to transmissions of the other RAT may be associated with one or more parameters, such as one or more of the aforementioned DMRS port indication, DMRS scrambling ID, QCL assumption, and/or TCI state.

In some aspects, a UE may be configured (e.g., preconfigured without receiving any signaling or configured via dynamic signaling) to rate match or refrain from rate matching based on a respective value with which each of the one or more parameters is configured. In other words, the UE may receive information indicating a correspondence (e.g., a mapping) from one or more parameters to one of rate matching or refraining from rate matching on the at least one spectrum band 620 available to be dynamically shared between the first RAT and the second RAT.

For example, a UE may be configured to rate match one of a PDSCH or a PUSCH if the UE is configured to use DMRS port #X, DMRS scrambling ID Z, QCL state z, and/or if the UE is configured to use TCI state x. Thus, the at least one spectrum band 620 may be dynamically shared such that data on the PDSCH (or PUSCH) may be assigned to resources 622 of the first RAT that are non-contiguous and do not overlap with resources 624 of the second RAT allocated from the spectrum band 620. When rate matching, orthogonality may be obtained in the frequency domain, and therefore, it may be unnecessary to pursue orthogonality in the spatial domain and the time domain. Rather, the UE may decode the resources 622 of the first RAT, while refraining from decoding those resources 624 of the second RAT, regardless of the fact that the resources 624 of the second RAT may overlap in the time domain with the resources 622 of the first RAT.

In another example, the UE may be configured to refrain from rate matching a PDSCH (or a PUSCH) if the UE is configured to use DMRS port #Y DMRS scrambling ID W, QCL state w, and/or TCI state y. Where the UE is configured to refrain from rate matching, the PDSCH (or PUSCH) may be scheduled on resources 626 that are dynamically shareable between the first RAT and the second RAT. Thus, data associated with the first RAT for the UE may be carried on the resources 626 that are dynamically shareable between the first RAT and the second RAT.

However, data associated with the second RAT may be scheduled on the dynamically shareable resources 626, as well. Consequently, transmissions associated with the first RAT may be non-orthogonal in the time and frequency domains to transmissions associated with the second RAT on the resources 626, such as where the transmissions of the first and second RATs are scheduled on overlapping resources that are dynamically shareable by both RATs. The lack of orthogonality in the time and frequency domains on the resources 626 may result in data associated with the first RAT colliding with data associated with the second RAT. Such collisions may be avoided through orthogonality in the spatial domain, which may be achieved through the one or more parameters, such as QCL state w, TCI state y, etc. Thus, data associated with the first RAT may be multiplexed in the spatial domain with other data associated with the second RAT on the dynamically shared resources 626.

In some other aspects, a UE may be configured to rate match or refrain from rate matching based on an indication received from a network node. The UE may receive such an indication in DCI or via another message (e.g., via MAC control element, RRC signaling, etc.). The pattern per DMRS port, DMRS scrambling ID, QCL state, and/or TCI state may be configured and/or indicated separately and independently.

Figure 7:
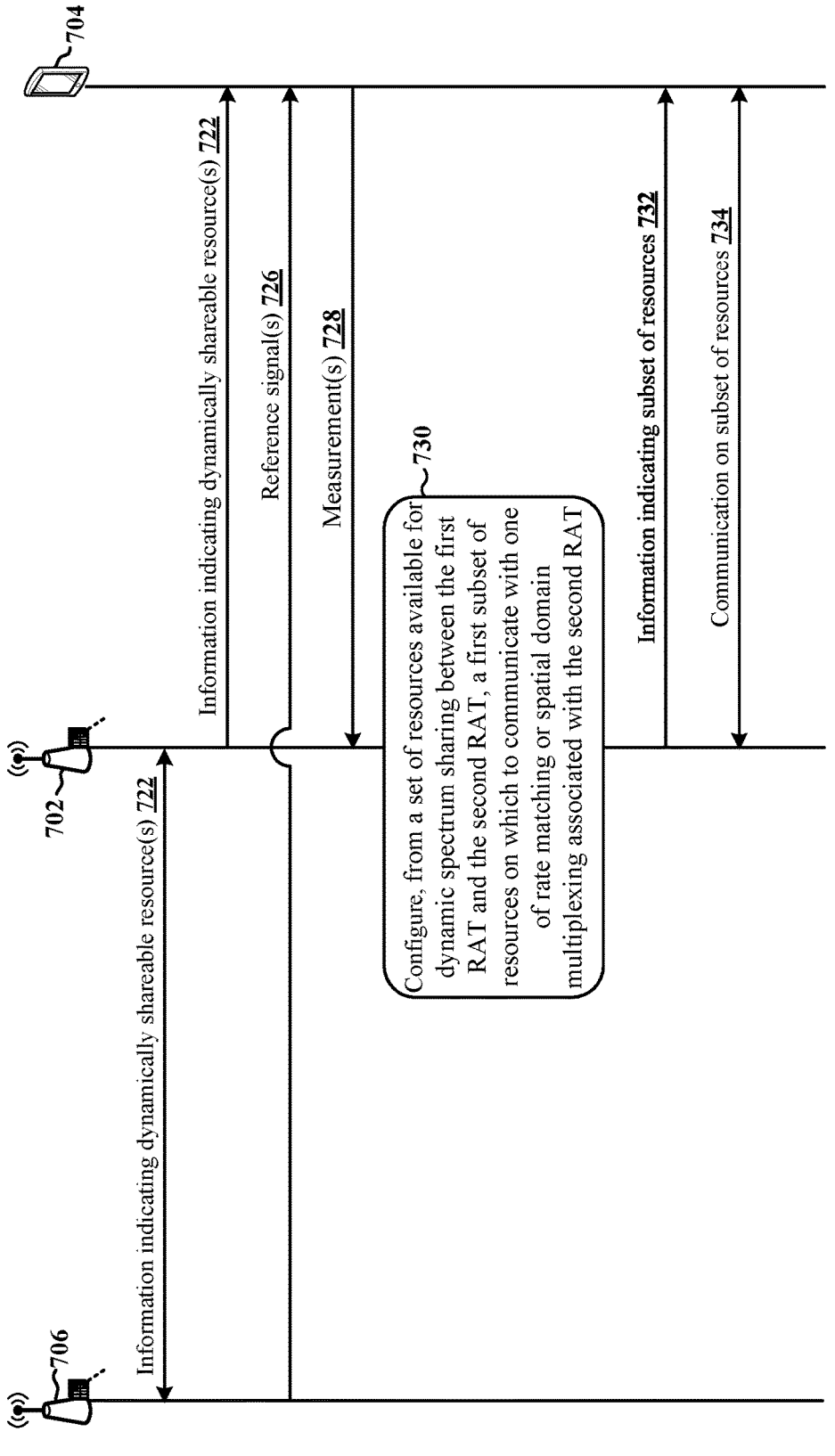
FIG. 7 is a call flow diagram illustrating example operations associated with spectrum sharing in the spatial domain across RATs.

FIG. 7 is a call flow diagram illustrating an example operations flow 700 associated with spectrum sharing in the spatial domain across RATs. Multi-RAT spectrum sharing may be facilitated in the spatial domain through inter-RAT coordination between network nodes. A network node of at least one of the RATs may be informed of inter-RAT interference experienced by at least one UE on a given beam (e.g., in a given direction). A UE may receive signaling from a non-serving RAT on a band (or carrier) that is configured for multi-RAT spectrum sharing so that the UE may measure such inter-RAT interference and report the results back to a network node of the serving RAT.

The network nodes of the at least two RATs may coordinate to select the resource(s) on which a UE is to measure inter-RAT interference. Accordingly, as shown in FIG. 7, a first network node 702 associated with a first RAT may communicate, with a second network node 706 associated with a second RAT, information indicating resource(s) 722 that are dynamically shareable between the first RAT and the second RAT.

A UE 704 associated with the first RAT may be configured to perform a measurement using a reference signal from a non-serving cell provided by the second network node 706 associated with the second RAT on a band or carrier configured for multi-RAT spectrum sharing. The QCL assumption for receiving such a reference signal(s) and/or the resources (e.g., occasions) on which such a reference signal(s) is transmitted may by indicated to the UE 704 by the network node 702 of the first RAT that is serving the UE 704. Thus, the first network node 702 may transmit, to the UE 704 associated with the first RAT, the information indicating the resource(s) 722 that are dynamically shareable between the first RAT and the second RAT, and at least one reference signal 726 of the second RAT may be scheduled on the resource(s) 722.

The UE 704 may set a receive beam of the UE 704 based on the indicated QCL assumption (e.g., QCL state, TCI state ID, etc.). The UE 704 may receive, from the second network node 706 associated with the second RAT, the at least one reference signal 726 of the second RAT that is scheduled on the dynamically shareable resource(s) 722 of the first RAT and the second RAT. According to various different aspects, the at least one reference signal may include at least one of a tracking reference signal (TRS), CSI-RS, or SSB.

The UE 704 may measure the interference in the direction of the receive beam based on receiving the at least one reference signal 726. The UE 704 may perform at least one measurement associated with spatial-domain interference on the dynamically shareable resource(s) 722 using the at least one reference signal 726 of the second RAT. For example, the UE 704 may measure at least one of a RSRP, RSRQ, SNR, SINR, a RSSI, etc. using the at least one reference signal of the second RAT. In some aspects, the at least one measurement includes a periodic measurement. In some other aspects, the at least one measurement includes an aperiodic measurement.

The UE 704 may transmit, to the first network node 702 associated with the first RAT, at least one measurement(s) 728 associated with spatial-domain interference on the resource(s) 722 that are dynamically shareable between the first RAT and the second RAT. As the receive beam of the UE 704 is associated with a transmit beam at the first network node 702, the first network node 702 may be configured to determine whether spatial-domain spectrum sharing is feasible or if rate matching should be performed.

The first network node 702 associated with the first RAT may receive the at least one measurement(s) 728 associated with spatial domain interference on the dynamically shareable resource(s) 722. The first network node 702 may configure 730, from a set of resources available for dynamic spectrum sharing between the first RAT and the second RAT, a first subset of resources on which to communicate with one of rate matching or spatial domain multiplexing associated with the second RAT.

In some aspects, the first subset of resources from the set of resources is configured based on the at least one measurement associated with spatial-domain interference on the at least one resource of the set of resources that is dynamically shareable between the first RAT and the second RAT. In some other aspects, the network node 702 may further configure at least one of a DMRS port, a DMRS scrambling ID, a QCL state, or a TCI state for communication with a UE 704 on the first subset of resources from the set of resources.

The first network node 702 may further transmit, to a UE 704 associated with the first RAT, information indicating at least one of the DMRS port, DMRS scrambling ID, QCL state, or TCI state for communication on the first subset of resources from the set of resources. In some aspects, the information indicating the at least one of the DMRS port, DMRS scrambling ID, QCL state, or TCI state is included in DCI. In some other aspects, the at least one of the DMRS port, DMRS scrambling ID, QCL state, or TCI state corresponds with one of rate matching or refraining from rate matching (e.g., spatial domain multiplexing) for communicating with the UE 704 on the first subset of resources from the set of resources. In some other aspects, information indicating the one of rate matching or spatial domain multiplexing associated with the second RAT is included in DCI. The DCI may further indicate a pattern associated with the rate matching when the information indicates the rate matching, or the DCI may indicate that the UE 704 is to refrain from rate matching (e.g., in favor of spatial division multiplexing).

Correspondingly, the UE 704 may receive, from the network node 702 associated with the first RAT, information 732 indicating a first subset of resources from the set of resources that are configured for dynamic spectrum sharing between the first RAT and the second RAT. In some aspects, the first subset of resources from the set of resources is configured as a PDSCH and/or a PUSCH. In some other aspects, the information 732 indicating the first subset of resources from the set of resources that are configured for dynamic spectrum sharing between the first RAT and the second RAT further indicates at least one of the DMRS port, DMRS scrambling ID, QCL state, or TCI state. In some aspects, the information 732 indicating the at least one of the DMRS port, DMRS scrambling ID, QCL state, or TCI state is received in DCI. In some other aspects, the at least one of the DMRS port, the DMRS scrambling ID, the QCL state, or the TCI state corresponds with one of rate matching or refraining from rate matching (e.g., spatial domain multiplexing) for communicating with the network node 702 on the first subset of resources from the set of resources.

The first network node 702 and the UE 704 associated with the first RAT may communicate 734 on the first subset of resources from the set of resources with one of rate matching or spatial domain multiplexing. In some aspects, communication 734 with the network node 702 on the first subset of resources from the set of resources is rate matched around a second subset of resources from the set of resources, which may be allocated to the second RAT. In some other aspects, communication with the network node 702 on the first subset of resources from the set of resources is multiplexed in the spatial domain with transmissions associated with the second RAT on such dynamically shareable resources (e.g., a transmission of the first RAT on dynamically shareable resources may be overlapping in the time and frequency domains with a transmission of the second RAT, and orthogonality may be realized in the spatial domain).

FIG. 8 is a flowchart of a method 800 of wireless communication. The method 800 may be performed by or at a base station (e.g., the base station 102/180, the base station 410, etc.), network node (e.g., the first network node 702, the second network node 706, etc.), another wireless communications apparatus (e.g., the apparatus 1102), or one or more components thereof. According to various different aspects of the method 800, one or more of the illustrated blocks may be omitted, transposed, and/or contemporaneously performed.

At 802, a network node associated with a first RAT may communicate, with another network node associated with a second RAT, information indicating at least one resource of a set of resources that is available for dynamic spectrum sharing between the first RAT and the second RAT. For example, the network node may transmit to or receive from the other network node information indicating the at least one resource of the set of resources that is available for dynamic spectrum sharing between the first and second RATs. In some further examples, the network node may receive from or transmit to the other network node information confirming the at least one resource of the set of resources.

In the context of FIG. 7, for example, the first network node 702 may communicate, with the second network node 706 associated with the second RAT, the information indicating the resource(s) 722 that are dynamically shareable between the first RAT and the second RAT.

At 804, the network node associated with the first RAT may transmit, to at least one UE associated with the first RAT, information indicating the at least one resource of the set of resources that is available for dynamic spectrum sharing between the first RAT and the second RAT. In some aspects, at least one reference signal of the second RAT is scheduled on the at least one resource of the set of resources.

In the context of FIG. 7, for example, the first network node 702 may transmit, to the UE 704 associated with the first RAT, the information indicating the resource(s) 722 that is dynamically shareable between the first RAT and the second RAT. In some aspects, at least one reference signal 726 of the second RAT is scheduled on the dynamically shareable resource(s) 722.

At 806, the network node associated with the first RAT may receive, from the at least one UE associated with the first RAT, at least one measurement associated with at least one resource of the set of resources that is available for dynamic spectrum sharing between the first RAT and the second RAT. For example, the at least one measurement may include at least one of an RSRP), RSRQ, SNR, SINR, a RSSI, etc. that is measured by the UE using the at least one reference signal of the second RAT. In some aspects, the at least one measurement includes a periodic measurement. In some other aspects, the at least one measurement includes an aperiodic measurement.

In the context of FIG. 7, for example, the first network node 702 may receive, from the UE 704 associated with the first RAT, at least one measurement(s) 728 that is based on the at least one reference signal 726 carried on the resource(s) 722 that is dynamically shareable between the first RAT and the second RAT.

At 808, the network node associated with the first RAT may configure, from a set of resources available for dynamic spectrum sharing between the first RAT and the second RAT, a first subset of resources on which to communicate with one of rate matching or spatial domain multiplexing associated with the second RAT. In some aspects, the first subset of resources from the set of resources is configured based on the at least one measurement from the at least one reference signal carried on the at least one resource of the set of resources available for dynamic spectrum sharing between the first RAT and the second RAT. In some other aspects, the network node may further configure at least one of a DMRS port, a DMRS scrambling ID, a QCL state, or a TCI state for communication with a UE on the first subset of resources from the set of resources.

In the context of FIG. 7, for example, the first network node 702 may configure, from a set of resources available for dynamic spectrum sharing between the first RAT and the second RAT, a first subset of resources on which to communicate with one of rate matching or spatial domain multiplexing associated with the second RAT. In some aspects, in the context of FIG. 6, the subset of resources 622 from the at least one spectrum band 620 may exclude another subset of resources 624 on which communication associated with the second RAT is scheduled. In some other aspects, in the context of FIG. 6, the subset of resources from the at least one spectrum band 620 associated with dynamic spectrum sharing between the first RAT and the second RAT may include the dynamically shared resources 626 of the first and second RATs, and communication in the first RAT and communication in the second RAT on the dynamically shared resources 626 may be multiplexed in the spatial domain so as to achieve orthogonality (although the communications in the two RATs may overlap in the time and/or frequency domains).

At 810, the network node associated with the first RAT may transmit, to a UE associated with the first RAT, information indicating at least one of the DMRS port, DMRS scrambling ID, QCL state, or TCI state for communication on the first subset of resources from the set of resources. In some aspects, the information indicating the at least one of the DMRS port, DMRS scrambling ID, QCL state, or TCI state is included in DCI. In some other aspects, the at least one of the DMRS port, DMRS scrambling ID, QCL state, or TCI state corresponds with one of rate matching or refraining from rate matching (e.g., spatial domain multiplexing) for communicating on the first subset of resources from the set of resources.

In the context of FIG. 7, for example, the first network node 702 may transmit, to the UE 704 associated with the first RAT, the information 732 indicating the first subset of resources, which may indicate the at least one of the DMRS port, DMRS scrambling ID, QCL state, or TCI state for communication on the first subset of resources from the set of resources. In some aspects, in the context of FIG. 6, the at least one of the DMRS port, DMRS scrambling ID, QCL state, or TCI state may be used for communication on the subset of resources 622 from the at least one spectrum band 620 that excludes the other subset of resources 624 on which communication associated with the second RAT is scheduled. In some other aspects, in the context of FIG. 6, the at least one of the DMRS port, DMRS scrambling ID, QCL state, or TCI state may be used for communication on the dynamically shared resources 626 of the first and second RATs, and communication in the first RAT and communication in the second RAT on the dynamically shared resources 626 may be multiplexed in the spatial domain in order to achieve orthogonality based on the at least one of the DMRS port, DMRS scrambling ID, QCL state, or TCI state.

At 812, the network node associated with the first RAT may communicate with the UE associated with the first RAT on the first subset of resources from the set of resources with the one of rate matching or spatial domain multiplexing. In some aspects, communication with the UE on the first subset of resources from the set of resources is rate matched around a second subset of resources from the set of resources allocated to the second RAT. In some other aspects, communication with the UE on the first subset of resources from the set of resources may be multiplexed in the spatial domain with communication associated with the second RAT on one or more dynamically shared resources.

In the context of FIG. 7, for example, the first network node 702 may communicate with the UE 704 associated with the first RAT on the first subset of resources from the set of resources with the one of rate matching or spatial domain multiplexing. In some aspects, in the context of FIG. 6, communication in the first RAT on the subset of resources 622 from the at least one spectrum band 620 may be rate matched around the subset of resources 624 allocated to carry communication in the second RAT. In some other aspects, in the context of FIG. 6, communication in the first RAT may be at least partially carried on dynamically shared resources 626 of the first and second RATs, and communication in the first RAT may be multiplexed in the spatial domain with communication in the second RAT on the dynamically shared resources 626 in order to achieve orthogonality in the spatial domain.

FIG. 9 is a flowchart of a method 900 of wireless communication. The method 900 may be performed by or at a UE (e.g., the UE 104, the UE 450, the UE 704, etc.), another wireless communications apparatus (e.g., the apparatus 1002), or one or more components thereof. According to various different aspects of the method 900, one or more of the illustrated blocks may be omitted, transposed, and/or contemporaneously performed.

At 902, a UE associated with a first RAT may be configured to receive, from a network node associated with the first RAT, information indicating at least one resource of a set of resources that is available for dynamic spectrum sharing between the first RAT and a second RAT. In some aspects, at least one reference signal of the second RAT may be scheduled on the at least one resource.

In the context of FIG. 7, for example, the UE 704 may receive, from the first network node 702 associated with the first RAT, the information indicating the resource(s) 722 that is dynamically shareable between the first RAT and the second RAT. In some aspects, at least one reference signal 726 of the second RAT is scheduled on the dynamically shareable resource(s) 722.

At 904, the UE associated with the first RAT may receive, from a second network node associated with the second RAT, the at least one reference signal on the at least one resource of the set of resources that is available for dynamic spectrum sharing between the first RAT and the second RAT. According to various different aspects, the at least one reference signal may include at least one of a TRS, CSI-RS, or SSB.

In the context of FIG. 7, for example, the UE 704 may receive, from the second network node 706 associated with the second RAT, the at least one reference signal 726 of the second RAT that is scheduled on the resource(s) 722 that is dynamically shareable between the first RAT and the second RAT.

At 906, the UE associated with the first RAT may perform at least one measurement on the at least one resource of the set of resources that is dynamically shareable between the first RAT and the second RAT using the at least one reference signal of the second RAT. For example, the UE may measure at least one of a RSRP, RSRQ, SNR, SINR, a RSSI, etc. using the at least one reference signal of the second RAT. In some aspects, the at least one measurement includes a periodic measurement. In some other aspects, the at least one measurement includes an aperiodic measurement.

In the context of FIG. 7, for example, the UE 704 may perform at least one measurement on the at least one resource of the set of resources that is dynamically shareable between the first RAT and the second RAT using the at least one reference signal 726 on the dynamically shareable resource(s) 722.

At 908, the UE associated with the first RAT may transmit, the at least one measurement to the network node associated with the first RAT.

In the context of FIG. 7, for example, the UE 704 may transmit, to the first network node 702 associated with the first RAT, the at least one measurement(s) 728.

At 910, the UE associated with the first RAT may receive, from the network node associated with the first RAT, information indicating a first subset of resources from the set of resources that is available for dynamic spectrum sharing between the first RAT and the second RAT with one of rate matching or spatial domain multiplexing. In some aspects, the first subset of resources from the set of resources may be configured as one of a PDSCH or a PUSCH in at least the first RAT. In some other aspects, the information indicating the first subset of resources from the set of resources further indicates at least one of a DMRS port, DMRS scrambling ID, QCL state, or TCI state. In some aspects, the information indicating the at least one of the DMRS port, DMRS scrambling ID, QCL state, or TCI state is received in DCI. In some other aspects, the at least one of the DMRS port, the DMRS scrambling ID, the QCL state, or the TCI state corresponds with the one of rate matching or refraining from rate matching (e.g., spatial domain multiplexing) for communicating with the network node associated with the first RAT on the first subset of resources from the set of resources.

In the context of FIG. 7, for example, the UE 704 may receive, from the first network node 702 associated with the first RAT, the information 732 indicating the first subset of resources, which may indicate the at least one of the DMRS port, DMRS scrambling ID, QCL state, or TCI state for communication on the first subset of resources from the set of resources. In some aspects, in the context of FIG. 6, the at least one of the DMRS port, DMRS scrambling ID, QCL state, or TCI state may be used for communication on the subset of resources 622 from the at least one spectrum band 620, excluding the other subset of resources 624 on which communication associated with the second RAT is scheduled. In some other aspects, in the context of FIG. 6, the at least one of the DMRS port, DMRS scrambling ID, QCL state, or TCI state may be used for communication on the dynamically shared resources 626 of the first and second RATs, although communication in the first RAT and communication in the second RAT on the dynamically shared resources 626 may be multiplexed in the spatial domain, e.g., based on the at least one of the DMRS port, DMRS scrambling ID, QCL state, or TCI state, which may achieve orthogonality.

At 912, the UE associated with the first RAT may communicate with the network node associated with the first RAT on the first subset of resources from the set of resources with the one of rate matching or spatial domain multiplexing. In some aspects, communication with the network node on the first subset of resources from the set of resources is rate matched around another subset of resources from the set of resources, e.g., where communication associated with the second RAT is scheduled on the other subset of resources from the set of resources. In some other aspects, communication with the network node on the first subset of resources from the set of resources is multiplexed in the spatial domain with communication associated with the second RAT that at least partially overlaps on the first subset of resources of the set of resources.

In the context of FIG. 7, for example, the UE 704 may communicate with the first network node 702 associated with the first RAT on the first subset of resources from the set of resources with the one of rate matching or spatial domain multiplexing. In some aspects, in the context of FIG. 6, communication on the first subset of resources 622 from the at least one spectrum band 620 may be rate matched around the other subset of resources 624 from the at least one spectrum band 620, which may be allocated to communication associated with the second RAT. In some other aspects, in the context of FIG. 6, communication in the first RAT may be at least partially carried on dynamically shared resources 626 of the first and second RATs, although communication in the first RAT and communication in the second RAT on the dynamically shared resources 626 may be multiplexed in the spatial domain.

Figure 10:
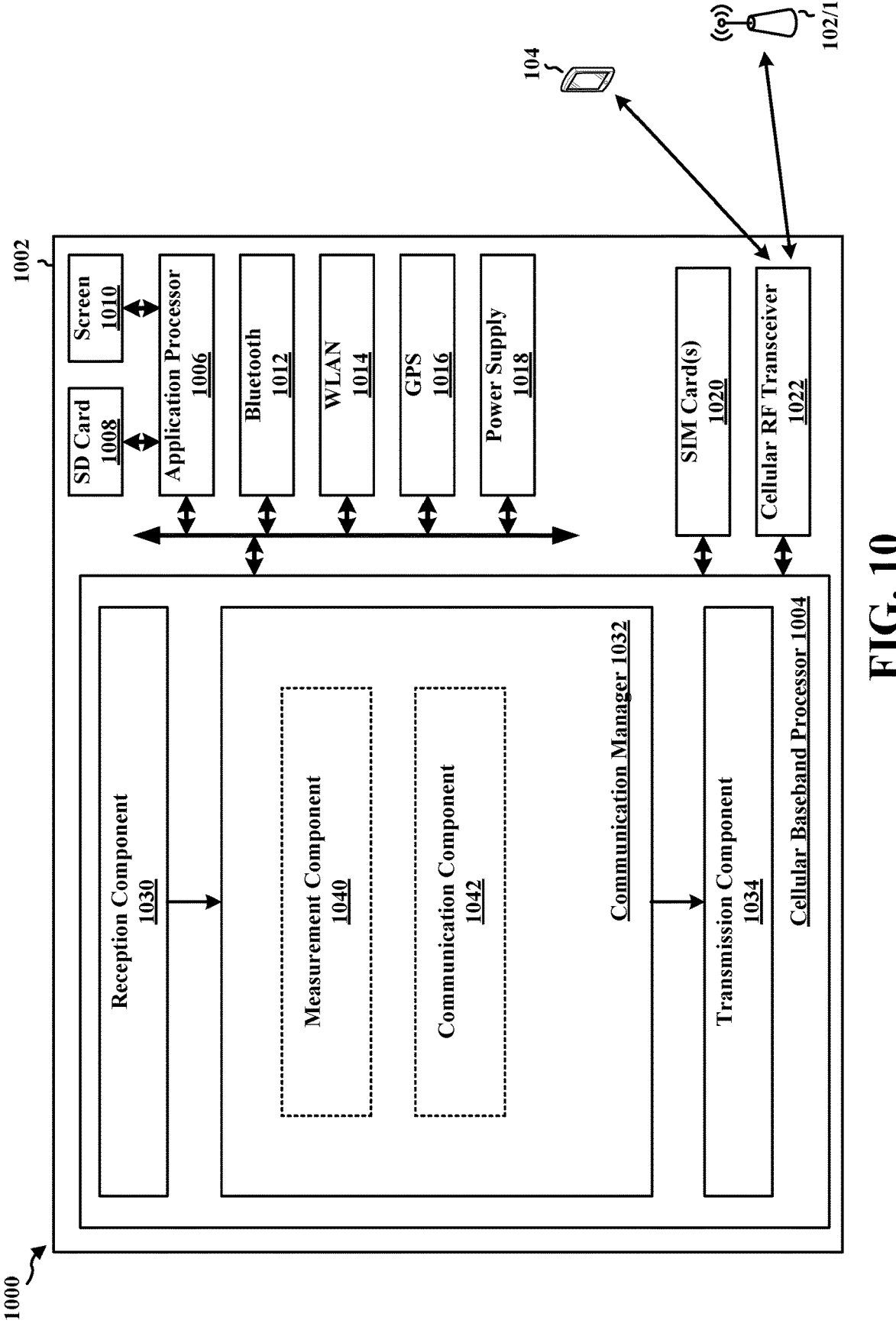
FIG. 10 is a diagram illustrating an example of a hardware implementation for an example apparatus.

FIG. 10 is a diagram 1000 illustrating an example of a hardware implementation for an apparatus 1002. The apparatus 1002 may be a UE or similar device, or the apparatus 1002 may be a component of a UE or similar device. The apparatus 1002 may include a cellular baseband processor 1004 (also referred to as a modem) and/or a cellular RF transceiver 1022, which may be coupled together and/or integrated into the same package, component, circuit, chip, and/or other circuitry.

In some aspects, the apparatus 1002 may accept or may include one or more subscriber identity modules (SIM) cards 1020, which may include one or more integrated circuits, chips, or similar circuitry, and which may be removable or embedded. The one or more SIM cards 1020 may carry identification and/or authentication information, such as an international mobile subscriber identity (IMSI) and/or IMSI-related key(s). Further, the apparatus 1002 may include one or more of an application processor 1006 coupled to a secure digital (SD) card 1008 and a screen 1010, a Bluetooth module 1012, a wireless local area network (WLAN) module 1014, a Global Positioning System (GPS) module 1016, and/or a power supply 1018.

The cellular baseband processor 1004 communicates through the cellular RF transceiver 1022 with the UE 104 and/or base station 102/180. The cellular baseband processor 1004 may include a computer-readable medium/ memory. The computer-readable medium/memory may be non-transitory. The cellular baseband processor 1004 is responsible for general processing, including the execution of software stored on the computer-readable medium/ memory. The software, when executed by the cellular baseband processor 1004, causes the cellular baseband processor 1004 to perform the various functions described supra. The computer-readable medium/memory may also be used for storing data that is manipulated by the cellular baseband processor 1004 when executing software. The cellular baseband processor 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the cellular baseband processor 1004.

In the context of FIG. 4, the cellular baseband processor 1004 may be a component of the UE 450 and may include the memory 460 and/or at least one of the TX processor 468, the RX processor 456, and/or the controller/processor 459. In one configuration, the apparatus 1002 may be a modem chip and/or may be implemented as the baseband processor 1004, while in another configuration, the apparatus 1002 may be the entire UE (e.g., the UE 450 of FIG. 4) and may include some or all of the abovementioned components, circuits, chips, and/or other circuitry illustrated in the context of the apparatus 1002. In one configuration, the cellular RF transceiver 1022 may be implemented as at least one of the transmitter 454TX and/or the receiver 454RX.

The reception component 1030 may be configured to receive signaling on a wireless channel, such as signaling from a base station 102/180 or UE 104. The transmission component 1034 may be configured to transmit signaling on a wireless channel, such as signaling to a base station 102/180 or UE 104. The communication manager 1032 may coordinate or manage some or all wireless communications by the apparatus 1002, including across the reception component 1030 and the transmission component 1034.

The reception component 1030 may provide some or all data and/or control information included in received signaling to the communication manager 1032, and the communication manager 1032 may generate and provide some or all of the data and/or control information to be included in transmitted signaling to the transmission component 1034. The communication manager 1032 may include the various illustrated components, including one or more components configured to process received data and/or control information, and/or one or more components configured to generate data and/or control information for transmission.

The reception component 1030 may be configured to receive, from a base station 102/180 associated with a first RAT, information indicating at least one resource of a set of resources that is available for dynamic spectrum sharing between the first RAT and a second RAT, e.g., as described in connection with 902 of FIG. 9. In some aspects, at least one reference signal of the second RAT may be scheduled on the at least one resource.

The reception component 1030 may be further configured to receive, from a second base station 102/180' associated with the second RAT, the at least one reference signal on the at least one resource of the set of resources that is available for dynamic spectrum sharing between the first RAT and the second RAT, e.g., as described in connection with 904 of FIG. 9. According to various different aspects, the at least one reference signal may include at least one of a TRS, CSI-RS, or SSB.

The measurement component 1040 may be configured to perform at least one measurement on the at least one resource of the set of resources that is dynamically shareable between the first RAT and the second RAT using the at least one reference signal of the second RAT, e.g., as described in connection with 906 of FIG. 9. For example, the measurement component 1040 may measure at least one of a RSRP, RSRQ, SNR, SINR, a RSSI, etc. using the at least one reference signal of the second RAT. In some aspects, the at least one measurement includes a periodic measurement. In some other aspects, the at least one measurement includes an aperiodic measurement.

The transmission component 1034 may be further configured to transmit, the at least one measurement to the base station 102/180 associated with the first RAT, e.g., as described in connection with 908 of FIG. 9.

The reception component 1030 may be further configured to receive, from the base station 102/180 associated with the first RAT, information indicating a first subset of resources from the set of resources that is available for dynamic spectrum sharing between the first RAT and the second RAT with one of rate matching or spatial domain multiplexing, e.g., as described in connection with 910 of FIG. 9. In some aspects, the first subset of resources from the set of resources may be configured as one of a PDSCH or a PUSCH in at least the first RAT. In some other aspects, the information indicating the first subset of resources from the set of resources further indicates at least one of a DMRS port, DMRS scrambling ID, QCL state, or TCI state. In some aspects, the information indicating the at least one of the DMRS port, DMRS scrambling ID, QCL state, or TCI state is received in DCI. In some other aspects, the at least one of the DMRS port, the DMRS scrambling ID, the QCL state, or the TCI state corresponds with the one of rate matching or refraining from rate matching (e.g., spatial domain multiplexing) for communicating with the base station 102/180 associated with the first RAT on the first subset of resources from the set of resources.

The communication component 1042 may be configured to communicate with the base station 102/180 associated with the first RAT on the first subset of resources from the set of resources with the one of rate matching or spatial domain multiplexing, e.g., as described in connection with 912 of FIG. 9. In some aspects, communication with the base station 102/180 on the first subset of resources from the set of resources is rate matched around another subset of resources from the set of resources, e.g., where communication associated with the second RAT is scheduled on the other subset of resources from the set of resources. In some other aspects, communication with the base station 102/180 on the first subset of resources from the set of resources is multiplexed in the spatial domain with communication associated with the second RAT that at least partially overlaps on the first subset of resources of the set of resources.

The apparatus 1002 may include additional components that perform some or all of the blocks, operations, signaling, etc. of the algorithm(s) in the aforementioned call flow diagram and/or flowchart of FIGS. 7 and/or 9, respectively. As such, some or all of the blocks, operations, signaling, etc. in the aforementioned call flow diagram and/or flowchart of FIGS. 7 and/or 9, respectively, may be performed by one or more components and the apparatus 1002 may include one or more such components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the cellular baseband processor 1004, includes means for receiving, from a network node associated with the first RAT, information indicating a first subset of resources from a set of resources available for dynamic spectrum sharing between the first RAT and a second RAT with one of rate matching or spatial domain multiplexing; and means for communicating with the network node associated with the first RAT on the first subset of resources from the set of resources with the one of rate matching or spatial domain multiplexing.

In one configuration, communication with the network node on the first subset of resources from the set of resources is rate matched around a second subset of resources from the set of resources.

In one configuration, communication with the network node on the first subset of resources from the set of resources is multiplexed in a spatial domain with communication associated with the second RAT on the first subset of resources.

In one configuration, the first subset of resources from the set of resources is configured as one of a PDSCH or a PUSCH.

In one configuration, the apparatus 1002, and in particular the cellular baseband processor 1004, may further include means for receiving, from the network node associated with the first RAT, information indicating at least one of a DMRS port, a DMRS scrambling ID, a QCL state, or a TCI state for communication with the network node on the first subset of resources from the set of resources, the one of the rate matching or the spatial domain multiplexing associated with the second RAT is based on the at least one of the DMRS port, the DMRS ID, the QCL state, or the TCI state.

In one configuration, information indicating the at least one of the DMRS port, DMRS scrambling ID, QCL state, or TCI state is received in DCI.

In one configuration, the at least one of the DMRS port, the DMRS scrambling ID, the QCL state, or the TCI state corresponds with one of rate matching or refraining from rate matching for communicating on the first subset of resources from the set of resources.

In one configuration, information indicating the one of rate matching or spatial domain multiplexing associated with the second RAT is included in DCI.

In one configuration, the DCI further indicates a pattern associated with the rate matching when the information indicates the rate matching.

In one configuration, the apparatus 1002, and in particular the cellular baseband processor 1004, may further include means for receiving, from a second network node associated with the second RAT, at least one reference signal on at least one resource of the set of resources that is available for dynamic spectrum sharing between the first RAT and the second RAT; means for performing at least one measurement on the at least one resource of the set of resources based on the at least one reference signal from the second network node associated with the second RAT; and means for transmitting the at least one measurement to the network node associated with the first RAT.

In one configuration, the apparatus 1002, and in particular the cellular baseband processor 1004, may further include means for receiving, from the network node, information indicating the at least one resource of the set of resources on which the at least one reference signal is scheduled.

In one configuration, the at least one measurement includes one of a periodic measurement or an aperiodic measurement.

The aforementioned means may be one or more of the aforementioned components of the apparatus 1002 configured to perform the functions recited by the aforementioned means. As described supra, the apparatus 1002 may include the TX Processor 468, the RX Processor 456, and the controller/processor 459. As such, in one configuration, the aforementioned means may be the TX Processor 468, the RX Processor 456, and the controller/processor 459 configured to perform the functions recited by the aforementioned means.

Figure 11:
FIG. 11 is a diagram illustrating another example of a hardware implementation for another example apparatus.

FIG. 11 is a diagram 1100 illustrating an example of a hardware implementation for an apparatus 1102. The apparatus 1102 may be a base station or similar device or system, or the apparatus 1102 may be a component of a base station or similar device or system. The apparatus 1102 may include a baseband unit 1104. The baseband unit 1104 may communicate through a cellular RF transceiver. For example, the baseband unit 1104 may communicate through a cellular RF transceiver with a UE 104, such as for downlink and/or uplink communication, and/or with a base station 102/180, such as for IAB.

The baseband unit 1104 may include a computer-readable medium/memory, which may be non-transitory. The baseband unit 1104 is responsible for general processing, including the execution of software stored on the computer-readable medium/memory. The software, when executed by the baseband unit 1104, causes the baseband unit 1104 to perform the various functions described supra. The computer-readable medium/memory may also be used for storing data that is manipulated by the baseband unit 1104 when executing software. The baseband unit 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the baseband unit 1104. The baseband unit 1104 may be a component of the base station 410 and may include the memory 476 and/or at least one of the TX processor 416, the RX processor 470, and the controller/processor 475.

The reception component 1130 may be configured to receive signaling on a wireless channel, such as signaling from a UE 104 or base station 102/180. The transmission component 1134 may be configured to transmit signaling on a wireless channel, such as signaling to a UE 104 or base station 102/180. The communication manager 1132 may coordinate or manage some or all wireless communications by the apparatus 1102, including across the reception component 1130 and the transmission component 1134.

The reception component 1130 may provide some or all data and/or control information included in received signaling to the communication manager 1132, and the communication manager 1132 may generate and provide some or all of the data and/or control information to be included in transmitted signaling to the transmission component 1134. The communication manager 1132 may include the various illustrated components, including one or more components configured to process received data and/or control information, and/or one or more components configured to generate data and/or control information for transmission. In some aspects, the generation of data and/or control information may include packetizing or otherwise reformatting data and/or control information received from a core network, such as the core network 190 or the EPC 160, for transmission.

The communication component 1144 may be configured to communicate, with a second base station 102/180' associated with a second RAT, information indicating at least one resource of a set of resources that is available for dynamic spectrum sharing between the first RAT and the second RAT, e.g., as described in connection with 802 of FIG. 8. For example, the communication component 1144 may transmit to or receive from the second base station 102/180' information indicating the at least one resource of the set of resources that is available for dynamic spectrum sharing between the first and second RATs. In some further examples, the communication component 1144 may receive from or transmit to the second base station 102/180' information confirming the at least one resource of the set of resources.

The transmission component 1134 may be configured to transmit, to at least one UE 104 associated with the first RAT, information indicating the at least one resource of the set of resources that is available for dynamic spectrum sharing between the first RAT and the second RAT, e.g., as described in connection with 804 of FIG. 8. In some aspects, at least one reference signal of the second RAT is scheduled on the at least one resource of the set of resources.

The reception component 1130 may be configured to receive, from the at least one UE 104 associated with the first RAT, at least one measurement associated with at least one resource of the set of resources that is available for dynamic spectrum sharing between the first RAT and the second RAT, e.g., as described in connection with 806 of FIG. 8. For example, the at least one measurement may include at least one of an RSRP), RSRQ, SNR, SINR, a RSSI, etc. that is measured by the UE 104 using the at least one reference signal of the second RAT. In some aspects, the at least one measurement includes a periodic measurement. In some other aspects, the at least one measurement includes an aperiodic measurement.

The configuration component 1140 may be configured to configure, from a set of resources available for dynamic spectrum sharing between the first RAT and the second RAT, a first subset of resources on which to communicate with one of rate matching or spatial domain multiplexing associated with the second RAT, e.g., as described in connection with 808 of FIG. 8. In some aspects, the first subset of resources from the set of resources is configured based on the at least one measurement from the at least one reference signal carried on the at least one resource of the set of resources available for dynamic spectrum sharing between the first RAT and the second RAT. In some other aspects, the configuration component 1140 may be further configured to configure at least one of a DMRS port, a DMRS scrambling ID, a QCL state, or a TCI state for communication with the UE 104 on the first subset of resources from the set of resources.

The transmission component 1134 may be further configured to transmit, to the UE 104 associated with the first RAT, information indicating at least one of the DMRS port, DMRS scrambling ID, QCL state, or TCI state for communication on the first subset of resources from the set of resources, e.g., as described in connection with 810 of FIG. 8. In some aspects, the information indicating the at least one of the DMRS port, DMRS scrambling ID, QCL state, or TCI state is included in DCI. In some other aspects, the at least one of the DMRS port, DMRS scrambling ID, QCL state, or TCI state corresponds with one of rate matching or refraining from rate matching (e.g., spatial domain multiplexing) for communicating on the first subset of resources from the set of resources.

The communication component 1144 may be further configured to communicate with the UE 104 associated with the first RAT on the first subset of resources from the set of resources with the one of rate matching or spatial domain multiplexing, e.g., as described in connection with 812 of FIG. 8. In some aspects, communication with the UE 104 on the first subset of resources from the set of resources is rate matched around a second subset of resources from the set of resources allocated to the second RAT. In some other aspects, communication with the UE 104 on the first subset of resources from the set of resources may be multiplexed in the spatial domain with communication associated with the second RAT on one or more dynamically shared resources.

The apparatus 1102 may include additional components that perform some or all of the blocks, operations, signaling, etc. of the algorithm(s) in the aforementioned call flow diagram and/or flowchart of FIGS. 7 and/or 8, respectively. As such, some or all of the blocks, operations, signaling, etc. in the aforementioned call flow diagram and/or flowchart of FIGS. 7 and/or 8, respectively, may be performed by a component and the apparatus 1102 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the baseband unit 1104, includes means for configuring, from a set of resources available for dynamic spectrum sharing between the first RAT and a second RAT, a first subset of resources on which to communicate with one of rate matching or spatial domain multiplexing associated with the second RAT; and means for communicating with a UE associated with the first RAT on the first subset of resources with the one of rate matching or spatial domain multiplexing.

In one configuration, communication with the UE on the first subset of resources from the set of resources is rate matched around a second subset of resources from the set of resources.

In one configuration, communication with the UE on the first subset of resources from the set of resources is multiplexed in a spatial domain with communication associated with the second RAT on the first subset of resources.

In one configuration, the first subset of resources from the set of resources is configured as one of a PDSCH or a PUSCH.

In one configuration, the means for configuring the first subset of resources from the set of resources may be configured to configure at least one of a DMRS port, a DMRS scrambling ID, a QCL state, or a TCI state for communication with the UE on the first subset of resources from the set of resources, and the one of rate matching or spatial domain multiplexing associated with the second RAT is based on the at least one of the DMRS port, the DMRS ID, the QCL state, or the TCI state.

In one configuration, the apparatus 1102, and in particular the baseband unit 1104, may further include means for transmitting, to the UE, information indicating at least one of the DMRS port, DMRS scrambling ID, QCL state, or TCI state.

In one configuration, the information indicating at least one of the DMRS port, DMRS scrambling ID, QCL state, or TCI state is included in DCI.

In one configuration, the at least one of the DMRS port, DMRS scrambling ID, QCL state, or TCI state corresponds with one of rate matching or refraining from rate matching for communicating on the first subset of resources from the set of resources.

In one configuration, information indicating the one of rate matching or spatial domain multiplexing associated with the second RAT is included in DCI.

In one configuration, the DCI further indicates a pattern associated with the rate matching when the information indicates the rate matching.

In one configuration, the apparatus 1102, and in particular the baseband unit 1104, may further include means for receiving, from at least one UE associated with the first RAT, at least one measurement associated with at least one resource of the set of resources that is available for dynamic spectrum sharing between the first RAT and the second RAT, and the first subset of resources from the set of resources is configured based on the at least one measurement.

In one configuration, the apparatus 1102, and in particular the baseband unit 1104, may further include means for transmitting, to the at least one UE associated with the first RAT, information indicating the at least one resource of the set of resources; and means for refraining from transmitting on the at least one resource of the set of resources, and at least one reference signal of the second RAT is scheduled on the at least one resource of the set of resources.

In one configuration, the apparatus 1102, and in particular the baseband unit 1104, may further include means for communicating, with another network node associated with the second RAT, information indicating the at least one resource of the set of resources that is available for dynamic spectrum sharing between the first RAT and the second RAT.

In one configuration, the at least one measurement includes one of a periodic measurement or an aperiodic measurement.

The aforementioned means may be one or more of the aforementioned components of the apparatus 1102 configured to perform the functions recited by the aforementioned means. As described supra, the apparatus 1102 may include the TX Processor 416, the RX Processor 470, and the controller/processor 475. As such, in one configuration, the aforementioned means may be the TX Processor 416, the RX Processor 470, and the controller/processor 475 configured to perform the functions recited by the aforementioned means.

The specific order or hierarchy of blocks or operations in each of the foregoing processes, flowcharts, and other diagrams disclosed herein is an illustration of example approaches. Based upon design preferences, the specific order or hierarchy of blocks or operations in each of the processes, flowcharts, and other diagrams may be rearranged, omitted, and/or contemporaneously performed without departing from the scope of the present disclosure. Further, some blocks or operations may be combined or omitted. The accompanying method claims present elements of the various blocks or operations in a sample order, and are not meant to be limited to the specific order or hierarchy presented.

The following clauses are illustrative only and may be combined with one or more of the aspects and various concepts or teachings described herein, without limitation.

1. A method of wireless communication at a network node associated with a first RAT, including:
   configuring, from a set of resources available for dynamic spectrum sharing between the first RAT and a second RAT, a first subset of resources on which to communicate with one of rate matching or spatial domain multiplexing associated with the second RAT; and communicating with a UE associated with the first RAT on the first subset of resources with the one of rate matching or spatial domain multiplexing.

2. The method of clause 1, and communication with the UE on the first subset of resources from the set of resources is rate matched around a second subset of resources from the set of resources.

3. The method of clause 1, and communication with the UE on the first subset of resources from the set of resources is multiplexed in a spatial domain with communication associated with the second RAT on the first subset of resources.

4. The method of any of clauses 1 to 3, and the first subset of resources from the set of resources is configured as one of a PDSCH or a PUSCH.

5. The method of any of clauses 1 to 4, and configuring the first subset of resources from the set of resources includes:
configuring at least one of a DMRS port, a DMRS scrambling ID, a QCL state, or a TCI state for communication with the UE on the first subset of resources from the set of resources,
and the one of rate matching or spatial domain multiplexing associated with the second RAT is based on the at least one of the DMRS port, the DMRS ID, the QCL state, or the TCI state.

6. The method of clause 5, further including:
transmitting, to the UE, information indicating at least one of the DMRS port, DMRS scrambling ID, QCL state, or TCI state.

7. The method of clause 6, and the information indicating at least one of the DMRS port, DMRS scrambling ID, QCL state, or TCI state is included in DCI.

8. The method of any of clauses 6 to 7, and the at least one of the DMRS port, DMRS scrambling ID, QCL state, or TCI state corresponds with one of rate matching or refraining from rate matching for communicating on the first subset of resources from the set of resources.

9. The method of any of clauses 1 to 8, and information indicating the one of rate matching or spatial domain multiplexing associated with the second RAT is included in DCI.

10. The method of clause 9, and the DCI further indicates a pattern associated with the rate matching when the information indicates the rate matching.

11. The method of any of clauses 1 to 10, further including:
receiving, from at least one UE associated with the first RAT, at least one measurement associated with at least one resource of the set of resources that is available for dynamic spectrum sharing between the first RAT and the second RAT, and
the first subset of resources from the set of resources is configured based on the at least one measurement.

12. The method of clause 11, further including:
transmitting, to the at least one UE associated with the first RAT, information indicating the at least one resource of the set of resources; and
refraining from transmitting on the at least one resource of the set of resources, and
at least one reference signal of the second RAT is scheduled on the at least one resource of the set of resources.

13. The method of any of clauses 11 to 12, further including:
communicating, with another network node associated with the second RAT, information indicating the at least one resource of the set of resources that is available for dynamic spectrum sharing between the first RAT and the second RAT.

14. The method of any of clauses 11 to 13, and the at least one measurement includes one of a periodic measurement or an aperiodic measurement.

15. A method of wireless communication at a UE associated with a first RAT, including:
receiving, from a network node associated with the first RAT, information indicating a first subset of resources from a set of resources available for dynamic spectrum sharing between the first RAT and a second RAT with one of rate matching or spatial domain multiplexing; and
communicating with the network node associated with the first RAT on the first subset of resources from the set of resources with the one of rate matching or spatial domain multiplexing.

16. The method of clause 15, and communication with the network node on the first subset of resources from the set of resources is rate matched around a second subset of resources from the set of resources.

17. The method of clause 15, and communication with the network node on the first subset of resources from the set of resources is multiplexed in a spatial domain with communication associated with the second RAT on the first subset of resources.

18. The method of any of clauses 15 to 17, and the first subset of resources from the set of resources is configured as one of a PDSCH or a PUSCH.

19. The method of any of clauses 15 to 18, further including:
receiving, from the network node associated with the first RAT, information indicating at least one of a DMRS port, a DMRS scrambling ID, a QCL state, or a TCI state for communication with the network node on the first subset of resources from the set of resources,
and the one of the rate matching or the spatial domain multiplexing associated with the second RAT is based on the at least one of the DMRS port, the DMRS ID, the QCL state, or the TCI state.

20. The method of clause 19, and information indicating the at least one of the DMRS port, DMRS scrambling ID, QCL state, or TCI state is received in DCI.

21. The method of any of clauses 19 to 20, and the at least one of the DMRS port, the DMRS scrambling ID, the QCL state, or the TCI state corresponds with one of rate matching or refraining from rate matching for communicating on the first subset of resources from the set of resources.

22. The method of any of clauses 15 to 21, and information indicating the one of rate matching or spatial domain multiplexing associated with the second RAT is included in DCI.

23. The method of clause 22, and the DCI further indicates a pattern associated with the rate matching when the information indicates the rate matching.

24. The method of any of clauses 15 to 23, further including:
receiving, from a second network node associated with the second RAT, at least one reference signal on at least one resource of the set of resources that is available for dynamic spectrum sharing between the first RAT and the second RAT;
performing at least one measurement on the at least one resource of the set of resources based on the at least one reference signal from the second network node associated with the second RAT; and transmitting the at least one measurement to the network node associated with the first RAT.

25. The method of clause 24, further including:
receiving, from the network node, information indicating the at least one resource of the set of resources on which the at least one reference signal is scheduled.

26. The method of any of clauses 24 to 25, and the at least one measurement includes one of a periodic measurement or an aperiodic measurement.

The previous description is provided to enable one of ordinary skill in the art to practice the various aspects described herein. Various modifications to these aspects will be readily apparent to those having ordinary skill in the art, and the generic principles defined herein may be applied to other aspects. Thus, the claims are not intended to be limited to the aspects shown herein, but is to be accorded the full scope consistent with the language. Thus, the language employed herein is not intended to limit the scope of the claims to only those aspects shown herein, but is to be accorded the full scope consistent with the language of the claims.

As one example, the language "determining" may encompass a wide variety of actions, and so may not be limited to the concepts and aspects explicitly described or illustrated by the present disclosure. In some contexts, "determining" may include calculating, computing, processing, measuring, deriving, investigating, looking up (e.g., looking up in a table, a database, or another data structure), ascertaining, resolving, selecting, choosing, establishing, and so forth. In some other contexts, "determining" may include communication and/or memory operations/procedures through which information or value(s) are acquired, such as "receiving" (e.g., receiving information), "accessing" (e.g., accessing data in a memory), "detecting," and the like.

As another example, reference to an element in the singular is not intended to mean "one and only one" unless specifically stated, but rather "one or more." Further, terms such as "if," "when," and "while" should be interpreted to mean "under the condition that" rather than imply an immediate temporal relationship or reaction. That is, these phrases, e.g., "when," do not imply an immediate action in response to or during the occurrence of an action or event, but rather imply that if a condition is met then another action or event will occur, but without requiring a specific or immediate time constraint or direct correlation for the other action or event to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a network node associated with a first radio access technology (RAT), comprising:
configuring, from a set of resources available for dynamic spectrum sharing between the first RAT and a second RAT, a first subset of resources on which to communicate with spatial domain multiplexing associated with the second RAT, wherein the configuring the first subset of resources from the set of resources comprises:
configuring at least one of a demodulation reference signal (DMRS) port, a DMRS scrambling identifier (ID), a quasi-collocation (QCL) state, or a transmission configuration indicator (TCI) state for communication with a user equipment (UE) on the first subset of resources from the set of resources,
wherein the spatial domain multiplexing associated with the second RAT is based on at least one of the DMRS port, the DMRS ID, the QCL state, or the TCI state; and
communicating with the UE associated with the first RAT on the first subset of resources with the spatial domain multiplexing.

2. The method of claim 1, wherein communication with the UE on the first subset of resources from the set of resources is multiplexed in a spatial domain with communication associated with the second RAT on the first subset of resources.

3. The method of claim 1, wherein the first subset of resources from the set of resources is configured as a physical downlink shared channel (PDSCH).

4. The method of claim 1, further comprising:
transmitting, to the UE, information indicating at least one of the DMRS port, DMRS scrambling ID, QCL state, or TCI state.

5. The method of claim 4, wherein the information indicating at least one of the DMRS port, DMRS scrambling ID, QCL state, or TCI state is included in downlink control information (DCI).

6. The method of claim 4, wherein the at least one of the DMRS port, DMRS scrambling ID, QCL state, or TCI state corresponds with refraining from rate matching for communicating on the first subset of resources from the set of resources.

7. The method of claim 1, wherein information indicating the spatial domain multiplexing associated with the second RAT is included in downlink control information (DCI).

8. The method of claim 1, further comprising:
receiving, from at least one UE associated with the first RAT, at least one measurement associated with at least one resource of the set of resources that is available for dynamic spectrum sharing between the first RAT and the second RAT, wherein
the first subset of resources from the set of resources is configured based on the at least one measurement.

9. The method of claim 8, further comprising:
transmitting, to the at least one UE associated with the first RAT, information indicating the at least one resource of the set of resources; and refraining from transmitting on the at least one resource of the set of resources, wherein at least one reference signal of the second RAT is scheduled on the at least one resource of the set of resources.

10. The method of claim 8, further comprising:

communicating, with another network node associated with the second RAT, information indicating the at least one resource of the set of resources that is available for dynamic spectrum sharing between the first RAT and the second RAT.

11. The method of claim 8, wherein the at least one measurement comprises one of a periodic measurement or an aperiodic measurement.

12. The method of claim 1, wherein the first subset of resources from the set of resources is configured as a physical uplink shared channel (PUSCH).

13. A method of wireless communication at a user equipment (UE) associated with a first radio access technology (RAT), comprising:

receiving, from a network node associated with the first RAT, information indicating a first subset of resources from a set of resources available for dynamic spectrum sharing between the first RAT and a second RAT with spatial domain multiplexing;

receiving, from the network node associated with the first RAT, information indicating at least one of a demodulation reference signal (DMRS) port, a DMRS scrambling identifier (ID), a quasi-collocation (QCL) state, or a transmission configuration indicator (TCI) state for communication with the network node on the first subset of resources from the set of resources, wherein the spatial domain multiplexing associated with the second RAT is based on the at least one of the DMRS port, the DMRS ID, the QCL state, or the TCI state; and communicating with the network node associated with the first RAT on the first subset of resources from the set of resources with the spatial domain multiplexing.

14. The method of claim 13, wherein communication with the network node on the first subset of resources from the set of resources is multiplexed in a spatial domain with communication associated with the second RAT on the first subset of resources.

15. The method of claim 13, wherein the first subset of resources from the set of resources is configured as a physical downlink shared channel (PDSCH).

16. The method of claim 13, wherein information indicating the at least one of the DMRS port, DMRS scrambling ID, QCL state, or TCI state is received in downlink control information (DCI).

17. The method of claim 13, wherein the at least one of the DMRS port, the DMRS scrambling ID, the QCL state, or the TCI state corresponds with refraining from rate matching for communicating on the first subset of resources from the set of resources.

18. The method of claim 13, wherein information indicating the spatial domain multiplexing associated with the second RAT is included in downlink control information (DCI).

19. The method of claim 13, further comprising:

receiving, from a second network node associated with the second RAT, at least one reference signal on at least one resource of the set of resources that is available for dynamic spectrum sharing between the first RAT and the second RAT;

performing at least one measurement on the at least one resource of the set of resources based on the at least one reference signal from the second network node associated with the second RAT; and transmitting the at least one measurement to the network node associated with the first RAT.

20. The method of claim 19, further comprising:

receiving, from the network node, information indicating the at least one resource of the set of resources on which the at least one reference signal is scheduled.

21. The method of claim 19, wherein the at least one measurement comprises one of a periodic measurement or an aperiodic measurement.

22. The method of claim 13, wherein the first subset of resources from the set of resources is configured as a physical uplink shared channel (PUSCH).

23. An apparatus for wireless communication at a network node associated with a first radio access technology (RAT), comprising:

a memory; and at least one processor coupled to the memory and configured to:

configure, from a set of resources available for dynamic spectrum sharing between the first RAT and a second RAT, a first subset of resources on which to communicate with spatial domain multiplexing associated with the second RAT, wherein to configure the first subset of resources from the set of resources, the at least one processor is further configured to:

configure at least one of a demodulation reference signal (DMRS) port, a DMRS scrambling identifier (ID), a quasi-collocation (QCL) state, or a transmission configuration indicator (TCI) state for communication with a user equipment (UE) on the first subset of resources from the set of resources, wherein the spatial domain multiplexing associated with the second RAT is based on at least one of the DMRS port, the DMRS ID, the QCL state, or the TCI state; and communicate with the UE associated with the first RAT on the first subset of resources with the spatial domain multiplexing.

24. The apparatus of claim 23, wherein the first subset of resources from the set of resources is configured as a physical uplink shared channel (PUSCH).

25. The apparatus of claim 23, wherein the at least one processor is further configured to:

transmit, to the UE, information indicating at least one of the DMRS port, DMRS scrambling ID, QCL state, or TCI state.

26. The apparatus of claim 25, wherein the information indicating at least one of the DMRS port, DMRS scrambling ID, QCL state, or TCI state is included in downlink control information (DCI).

27. An apparatus for wireless communication at a user equipment (UE) associated with a first radio access technology (RAT), comprising:

a memory; and at least one processor coupled to the memory and configured to:

receive, from a network node associated with the first RAT, information indicating a first subset of resources from a set of resources available for dynamic spectrum sharing between the first RAT and a second RAT with spatial domain multiplexing;

receive, from the network node associated with the first RAT, information indicating at least one of a demodulation reference signal (DMRS) port, a DMRS scrambling identifier (ID), a quasi-collocation (QCL) state, or a transmission configuration indicator (TCI) state for communication with the network node on the first subset of resources from the set of resources, wherein the spatial domain multiplexing associated with the second RAT is based on the port, the DMRS ID, the QCL state, or the TCI state; and communicate with the network node associated with the first RAT on the first subset of resources from the set of resources with the spatial domain multiplexing.

28. The apparatus of claim 27, wherein the first subset of resources from the set of resources is configured as a physical uplink shared channel (PUSCH).

29. The apparatus of claim 27, wherein information indicating the at least one of the DMRS port, DMRS scrambling ID, QCL state, or TCI state is received in downlink control information (DCI).

30. The apparatus of claim 27, wherein the at least one of the DMRS port, the DMRS scrambling ID, the QCL state, or the TCI state corresponds with refraining from rate matching for communicating on the first subset of resources from the set of resources.

* * * * *